(12) United States Patent
Kinoshita

(10) Patent No.: US 9,356,499 B2
(45) Date of Patent: May 31, 2016

(54) ELECTROMAGNETIC GENERATOR

(75) Inventor: Shinji Kinoshita, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 420 days.

(21) Appl. No.: 13/882,525

(22) PCT Filed: Nov. 30, 2011

(86) PCT No.: PCT/JP2011/077592
§ 371 (c)(1),
(2), (4) Date: Jul. 2, 2013

(87) PCT Pub. No.: WO2012/073980
PCT Pub. Date: Jun. 7, 2012

(65) Prior Publication Data
US 2013/0285479 A1 Oct. 31, 2013

(30) Foreign Application Priority Data

Nov. 30, 2010 (JP) .................................. 2010-267376
Dec. 29, 2010 (JP) .................................. 2010-294573
Sep. 22, 2011 (JP) .................................. 2011-208179

(51) Int. Cl.
*H02K 35/02* (2006.01)
(52) U.S. Cl.
CPC ...................................... *H02K 35/02* (2013.01)
(58) Field of Classification Search
None
See application file for complete search history.

(56) References Cited

U.S. PATENT DOCUMENTS

| | | | | |
|---|---|---|---|---|
| 3,100,292 A * | 8/1963 | Warner, Jr. | ............ | G01H 11/02 367/185 |
| 3,129,347 A * | 4/1964 | Tognola | ................ | G01H 11/02 310/15 |
| 4,785,816 A * | 11/1988 | Dow | ...................... | G01N 29/26 310/30 |
| 6,220,719 B1 * | 4/2001 | Vetorino | ................ | F21L 13/06 362/192 |
| 6,501,357 B2 * | 12/2002 | Petro | ........................ | H01F 7/13 310/17 |

(Continued)

FOREIGN PATENT DOCUMENTS

| CN | 2367014 | 3/2000 |
|---|---|---|
| CN | 1852011 | 10/2006 |

(Continued)

OTHER PUBLICATIONS

English-language translation of Notification of Reasons for Refusal mailed May 13, 2015 issued in Japanese Patent Appln. No. 2012-546898.

(Continued)

*Primary Examiner* — Tran Nguyen
(74) *Attorney, Agent, or Firm* — Adams & Wilks

(57) ABSTRACT

An electromagnetic generator includes a magnet assembly having permanent magnets magnetized in a direction of stacking so that surfaces thereof corresponding to the same pole face each other. A solenoid coil is positioned around the magnet assembly so that a position of the solenoid coil relative to the magnet assembly can be changed. Holding parts hold the solenoid coil so that a center of the solenoid coil in a winding axis direction corresponds to a plane position where the surfaces of the permanent magnets corresponding to the same pole face each other at a stop position. Repulsive magnets generate magnetic repulsive forces that maintain the magnet assembly separated from the repulsive magnets. A length of an end face of each permanent magnet in a direction perpendicular to the winding axis direction is equal to or larger than double a length of the permanent magnet in the winding axis direction.

20 Claims, 18 Drawing Sheets

(56) References Cited

U.S. PATENT DOCUMENTS

| | | | |
|---|---|---|---|
| 6,600,399 B1 * | 7/2003 | Trandafir | H01F 7/066 335/222 |
| 6,936,937 B2 | 8/2005 | Tu et al. | 310/12 |
| 7,449,803 B2 * | 11/2008 | Sahyoun | H02K 33/16 310/14 |
| 7,557,473 B2 * | 7/2009 | Butler | H02K 33/16 310/20 |
| 2003/0234585 A1 | 12/2003 | Tu et al. | 310/12 |
| 2006/0208600 A1 * | 9/2006 | Sahyoun | H02K 33/16 310/254.1 |
| 2007/0194634 A1 | 8/2007 | Roberts | 310/15 |
| 2009/0146508 A1 | 6/2009 | Peng et al. | 310/15 |

FOREIGN PATENT DOCUMENTS

| | | |
|---|---|---|
| CN | 1860663 | 11/2006 |
| CN | 201263119 | 6/2009 |
| CN | 201608619 | 10/2010 |
| JP | 5176501 | 7/1993 |
| JP | 2006523081 | 10/2006 |
| JP | 2009148144 | 7/2009 |
| JP | 2009171796 | 7/2009 |
| JP | 2009528009 | 7/2009 |
| WO | 2005031952 | 4/2005 |

OTHER PUBLICATIONS

English translation of First Notification of Examination Opinion mailed Mar. 18, 2015 issued in Chinese Patent Appln. No. 201180057614.8.

Patent Abstracts of Japan, Publication No. 2009-100523, Publication Date, May 7, 2009.

Patent Abstracts of Japan, Publication No. 2009-213194, Publication Date, Sep. 17, 2009.

Patent Abstracts of Japan, Publication No. 2006-296144, Publication Date, Oct. 26, 2006.

* cited by examiner

Fig. 7

| LENGTH OF END FACE/LENGTH IN AXIAL DIRECTION OF CYLINDRICAL SHAFT | 4 | 2 | 1.33 | 1 |
|---|---|---|---|---|
| WEIGHT OF MOVABLE PORTION [g] | 7.8 | 15.6 | 23.4 | 31.2 |
| FREQUENCY [Hz] | 60 | 60 | 60 | 60 |
| AMPLITUDE [mm] | 1 | 1 | 1 | 1 |
| SPRING CONSTANT [g/mm] | 56.5 | 113.0 | 169.6 | 226.1 |

ELECTROMAGNETIC GENERATOR

BACKGROUND OF THE INVENTION

1. Technical Field

The present invention relates to an electromagnetic generator that generates electric power when permanent magnets and a solenoid coil move relative to each other in a winding axis direction of a coil.

2. Background Art

In a generator that generates electric power when permanent magnets and a solenoid coil move relative to each other in a winding axis direction of a coil, the permanent magnets and the solenoid coil are disposed so as to face each other with an interval therebetween. Further, the generator converts kinetic energy, which is generated by the relative movement of the permanent magnets and the solenoid coil, into electric energy that is induced on the coil.

Here, in a generator in the related art, magnetic flux density is locally increased by stacking a plurality of permanent magnets so that the same poles face each other and a large amount of electric power is obtained by interlinking much magnetic flux with coils.

Further, in another related art, there has been a generator in which coils are wound on the outer periphery of a single permanent magnet in a circumferential direction so as to face the permanent magnet and the frequency of external environmental vibration corresponds to the natural frequency of the permanent magnet, which moves relative to the coils, in a moving direction so that electric power of a high output is obtained from the resonance between the external vibration and the natural frequency.

SUMMARY OF THE INVENTION

However, in the related art, the permanent magnets are moved between the plurality of coils so that electric power is generated. For this reason, there is a problem in that sufficient electric power is not obtained when the permanent magnets and the coils face each other at the position where magnetic flux density is low and the permanent magnets reciprocate by a short distance.

Further, in another related art, the permanent magnet has been held by a coil spring. Accordingly, even though deflection is adjusted by a non-linear coil spring when deflection is adjusted by the change of the natural frequency of the permanent magnet in the moving direction, deflection is increased if a frequency is significantly changed. For this reason, a long coil spring having an effective length should be used. As a result, there is a problem in that the size of a device is increased. Furthermore, since magnetization preventive means is provided between the coil spring and the permanent magnet to prevent the magnetization of the coil spring, a device is complicated.

Accordingly, an object of the invention is to provide an electromagnetic generator that generates a large amount of electric power even with low environmental vibration, can adjust the natural frequency of a permanent magnet in a moving direction in a wide range according to the frequency of external vibration, and is of a small size and has high efficiency.

In order to solve the above-mentioned problems, according to a first aspect of the invention, there is provided an electromagnetic generator including a magnet assembly in which a plurality of permanent magnets are magnetized in a stacking direction and stacked so that surfaces of the permanent magnets corresponding to the same pole face each other and a solenoid coil that is positioned around the side surface of the magnet assembly. The magnet assembly is adapted so that the position of the magnet assembly relative to the solenoid coil is changeable. The electromagnetic generator includes holding parts that hold the magnet assembly so that a plane position where the surfaces of the magnet assembly corresponding to the same pole face each other corresponds to a center of the solenoid coil in a winding axis direction at a stop position.

According to this aspect, magnetic flux density is at a maximum in the circumferential direction of the magnets at the plane position where the surfaces, which correspond to the same pole, of two permanent magnets, which are magnetized in the stacking direction, face each other at the stop position. It is possible to maximize magnetic flux, which is interlinked with the solenoid coil, by making the center of the solenoid coil in the winding axis direction correspond to the plane position. For this reason, even though the moving distance of the permanent magnet is short, a large amount of electric power is obtained from the solenoid coil.

According to a second aspect of the invention, in the electromagnetic generator according to the first aspect of the invention, the holding parts are permanent magnets.

According to this aspect, it is possible to make the magnet assembly accurately correspond to the center of the solenoid coil in the winding axis direction.

According to a third aspect of the invention, in the electromagnetic generator according to the first aspect of the invention, the holding parts are elastic bodies.

According to this aspect, it is possible to make the magnet assembly accurately correspond to the center of the solenoid coil in the winding axis direction.

According to a fourth aspect of the invention, in the electromagnetic generator according to any one of the first to third aspects of the invention, the holding parts include a distance adjusting mechanism that faces the magnet assembly and changes distances between the holding parts and the magnet assembly.

According to this aspect, the spring constant of the holding part is changed by the adjustment of the distance between the magnet assembly and the holding part. Accordingly, it is possible to change the natural frequency of the magnet assembly in the moving direction of the magnet assembly. For this reason, it is possible to make the magnet assembly resonate according to the frequency of external vibration, so that it is possible to generate a large amount of electric power in the coil.

According to a fifth aspect of the invention, in the electromagnetic generator according to the first, second, or fourth aspect of the invention, the holding parts include permanent magnets for the holding parts that face the magnet assembly and correspond to a magnetic pole repelling the magnet assembly, and a distance adjusting mechanism that changes distances between the permanent magnets for the holding parts and the magnet assembly.

According to this aspect, since a repulsive force between the magnet assembly and the permanent magnet has a spring property that exponentially changes relative to the distance between the magnet assembly and the permanent magnet, it is possible to change a spring constant into a significantly different spring constant with the small change of a distance. For this reason, since it is possible to significantly change the natural frequency even though slightly moving the holding part, it is possible to make the electromagnetic generator small.

According to a sixth aspect of the invention, in the electromagnetic generator according to the fourth or fifth aspect of the invention, the distance adjusting mechanism is a screw mechanism.

According to this aspect, since it is possible to finely adjust a distance, it is possible to accurately adjust the natural frequency.

According to a seventh aspect of the invention, the electromagnetic generator according to any one of the first to sixth aspects of the invention further includes a first air chamber that is formed between the holding part and one permanent magnet of the magnet assembly and a second air chamber that is formed between the holding part and the other permanent magnet of the magnet assembly, and the first and second air chambers communicate with the atmosphere.

According to this aspect, the flow of air in the air chambers, which is associated with the change of the volumes of the first and second air chambers caused by the movement of the magnet assembly, does not depend on the flow of air passing through a narrow passage that is formed on the outer periphery of the magnet assembly. For this reason, since the vibration of the magnet assembly is less damped by the air flowing through the narrow passage and the response magnification of the magnet assembly at the time of resonance is increased, the magnet assembly can move relative to the solenoid coil at high speed. Accordingly, a large amount of electric power is obtained.

According to an eighth aspect of the invention, in the electromagnetic generator according to any one of the first to seventh aspects of the invention, the holding parts are configured to interpose the magnet assembly therebetween.

According to this aspect, it is possible to make the magnet assembly accurately correspond to the center of the solenoid coil in the winding axis direction.

According to a ninth aspect of the invention, there is provided an electromagnetic generator including a magnet assembly in which a plurality of permanent magnets are magnetized in a stacking direction and stacked so that surfaces of the permanent magnets corresponding to the same pole face each other and a solenoid coil that is positioned around the side surface of the magnet assembly. The solenoid coil is adapted so that the position of the solenoid coil relative to the magnet assembly is changeable. The electromagnetic generator includes a holding part that holds the solenoid coil so that a center of the solenoid coil in a winding axis direction corresponds to a plane position where the surfaces of the magnet assembly corresponding to the same pole face each other at a stop position.

According to this aspect, magnetic flux density is at a maximum in the circumferential direction of the magnets at the plane position where the surfaces, which correspond to the same pole, of two permanent magnets, which are magnetized in the stacking direction, face each other at the stop position. It is possible to maximize magnetic flux, which is interlinked with the solenoid coil, by making the center of the solenoid coil in the winding axis direction correspond to the plane position. For this reason, even though the moving distance of the permanent magnet relative to the solenoid coil is short, a large amount of electric power is obtained from the solenoid coil.

Further, since the solenoid coil is adapted so that the position of the solenoid coil relative to the magnet assembly is changeable, it is possible to set the weight of the solenoid coil, which is displaced by vibrating, to a light weight. When the size of the permanent magnet is large so that a large amount of electric power is obtained, the mass of the permanent magnet is large. Accordingly, a spring load of the structure moving the permanent magnet also needs to be large so as to correspond to the frequency where resonance occurs with external environmental vibration. Since large mass and a large spring load increases the friction against the guide member in the moving direction when the permanent magnets vibrate, electric power cannot be efficiently generated. However, since a spring load of the structure moving a light solenoid coil is also small, the friction against the guide member in the moving direction is small. Accordingly, electric power can be efficiently generated.

According to a tenth aspect of the invention, in the electromagnetic generator according to any one of the first to ninth aspects of the invention, when a distance where the relative position of the magnet assembly and the solenoid coil change is denoted by X, and the length of the solenoid coil in the winding axis direction is denoted by L, and the length of the magnet assembly in the stacking direction is denoted by T X is set so as to satisfy "X≤T×0.7−L".

According to this aspect, as shown in the distribution of the magnetic flux density of FIG. 3 to be described below, the solenoid coil and the magnet assembly move relative to each other in the range of a single magnetic polarity. Accordingly, an electro motive force in the opposite direction is not generated on the solenoid coil. Therefore, a large amount of electric power is obtained.

According to an eleventh aspect of the invention, in the electromagnetic generator according to the first to tenth aspects of the invention, the length of an end face of the permanent magnet in a direction perpendicular to the winding axis direction is equal to or larger than double the length of the permanent magnet in the winding axis direction.

According to this aspect, it is possible to obtain a reliable electromagnetic generator by securing a long distance between the magnet assembly and the repulsive magnet and thus preventing contact. Further, since the repulsive magnet can be made small, it is possible to make the electromagnetic generator small and light.

According to the electromagnetic generator of the invention, it is possible to form an electromagnetic generator that generates a large amount of electric power even with low external environmental vibration. Accordingly, the invention can improve the efficiency of an electromagnetic generator.

BRIEF DESCRIPTION OF THE DRAWINGS

FIG. 7 is a table of spring constants when magnet assemblies are vibrated at a frequency of 60 Hz and a total amplitude of 1 mm.

DETAILED DESCRIPTION OF THE INVENTION

First Example

An embodiment (first example) of an electromagnetic generator according to the invention will be described below with reference to FIGS. 1 to 10.

Figure 1:
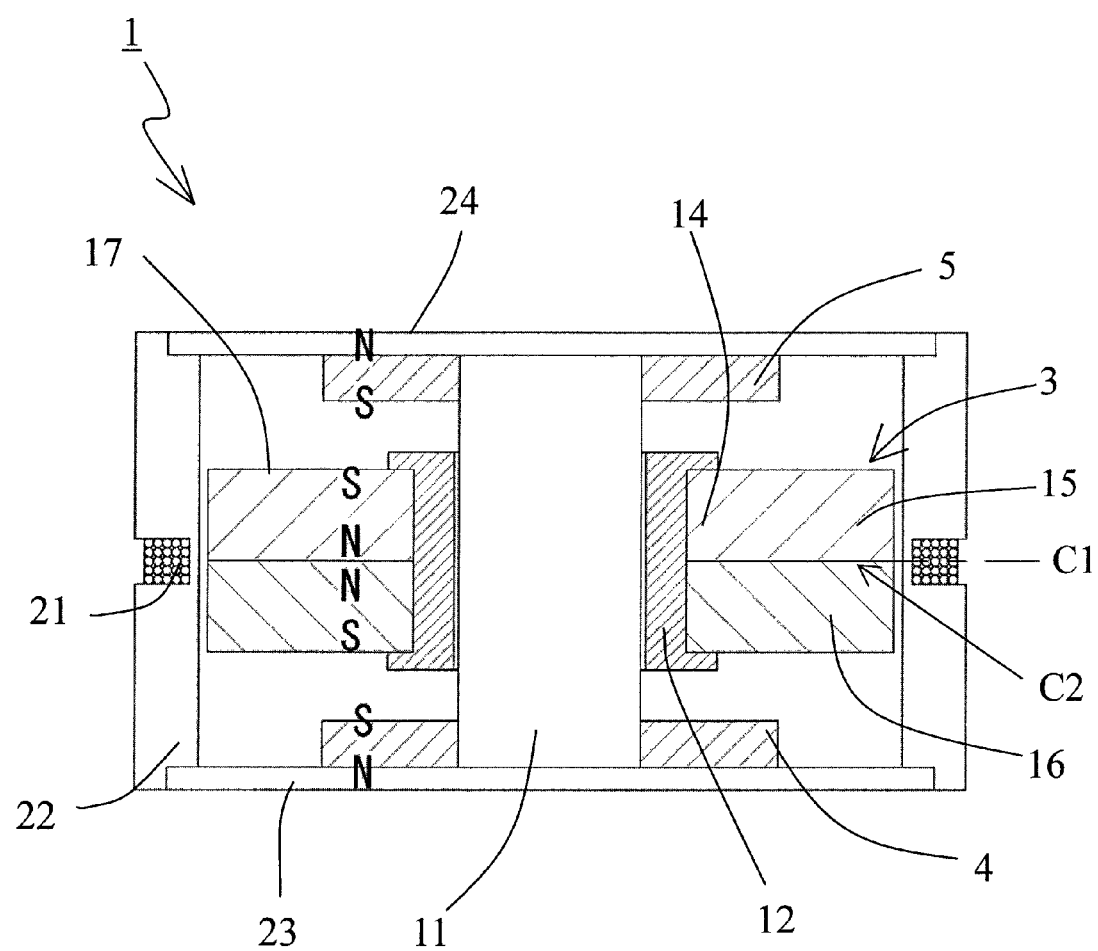
FIG. 1 is a cross-sectional view of an electromagnetic generator according to a first example of the invention.

As shown in FIG. 1, an electromagnetic generator 1 includes a magnet assembly 3, a magnet holder 12, a guide bar 11 that guides the movement of the magnet assembly 3, housings 23 and 24 that hold the guide bar 11 from both ends of the guide bar 11, repulsive magnets 4 and 5 as repulsion means that act as a magnetic spring and repel the magnet assembly 3, a case 22, and a solenoid coil 21 that generates electric power by an electromagnetic induction action between the magnet assembly and the solenoid coil.

The housings 23 and 24 are formed of circular discs.

The guide bar 11 is formed of a round bar. Further, the guide bar 11 is provided so as to extend from the center of the surface of one of the discs, which form the housings 23 and 24, in the direction perpendicular to the surface of the other disc.

Since the magnet holder 12 is mounted so that the guide bar 11 passes through the magnet holder 12 and is made of a resin such as PPS (Polyphenylene sulfide), the magnet holder 12 slides on the outer peripheral surface of the guide bar 11 with low friction.

The magnet assembly 3 is a disc-shaped magnet including a center hole 14 that is formed at the center thereof and fitted to the cylindrical outer peripheral surface of the magnet holder 12. The center hole 14 of the magnet assembly 3 is fitted to the cylindrical outer peripheral surface of the magnet holder 12 and is fixed to the magnet holder 12 so that the magnet assembly 3 is positioned coaxially with the magnet holder 12. Accordingly, the magnet assembly 3 is adapted to be capable of linearly reciprocating on the guide bar 11 in the extension direction of the guide bar 11 with the magnet holder 12 interposed therebetween. The magnet assembly 3 has a structure where two disc-shaped unit magnets 15 and 16 each of which includes a center hole 14 that is formed at the center thereof and fitted to the cylindrical outer peripheral surface of the magnet holder 12 are stacked in the direction parallel to the guide bar 11. One circular surface 17 of the unit magnet 15 is magnetized to an S pole, and the other circular surface of the unit magnet 15 is magnetized to an N pole. As shown in FIG. 1, the magnet assembly 3 is fitted and fixed to the magnet holder 12 so that one circular surfaces 17 or the other circular surfaces of the unit magnets 15 and 16 face each other. That is, the magnet assembly 3 is formed by fixing the unit magnets 15 and 16 so that the surfaces of the unit magnets 15 and 16 magnetized to the same pole face each other.

The repulsive magnets 4 and 5 are disc-shaped magnets, and are bonded and fixed to the housings 23 and 24 so that the surfaces of the repulsive magnets 4 and 5 and the magnet assembly 3 facing each other correspond to the same pole. Accordingly, since the magnet assembly 3 is repelled by the repulsive magnet 4 or 5 corresponding to the same pole when approaching the repulsive magnet 4 or 5, the magnet assembly 3 is moved in a direction where the magnet assembly 3 is separated from the repulsive magnet 4 or 5. Further, the outer diameters and thicknesses of the repulsive magnets 4 and 5 are smaller than the outer diameters and thicknesses of the unit magnets 15 and 16. Accordingly, the repulsive forces of the repulsive magnets 4 and 5 are small, so that the moving distance of the magnet assembly 3 can be increased even in the case of external vibration of low frequency (vibration of frequency of 100 Hz or less).

The case 22 is fitted to the housings 23 and 24 that are provided on both ends. Further, the case 22 is a non-magnetic body and is formed in a cylindrical shape. It is preferable that the case 22 be made of a non-conductive material such as a resin (PPS or the like). Furthermore, the case 22 includes a groove which is formed on the middle of a cylindrical body portion thereof and in which the solenoid coil 21 is received. A center C1 of the groove, in which the solenoid coil 21 is received, in a stacking direction substantially corresponds to a plane position C2 where the surfaces corresponding to the same pole face each other when the magnet assembly 3 is stopped without external vibration.

The solenoid coil 21 is wound in the circumferential direction in the groove that is formed on the middle of the cylindrical body portion of the case 22. Since the center C1 of the groove of the case 22 in the stacking direction substantially corresponds to a plane position C2 where the surfaces of the stopped magnet assembly corresponding to the same pole face each other, the center of the solenoid coil 21 in a winding axis direction also corresponds to the center C1 and substantially corresponds to the plane position C2 where the surfaces of the stopped magnet assembly corresponding to the same pole face each other.

The housing 23 or 24 of the electromagnetic generator 1 having the above-mentioned structure is fixed to an electric motor (not shown) or the like. Further, since a body of the electric motor vibrates due to the imbalance of a rotor or the like when the electric motor is rotated, the electromagnetic generator 1 vibrates. The magnet assembly 3, which is held at an equilibrium position in the axial direction of the guide bar by the magnetic forces of the repulsive magnets 4 and 5, linearly reciprocates in the axial direction of the guide bar due to vibration, so that an induced electromotive force is generated on the solenoid coil 21 provided on the outer periphery.

Figure 3:
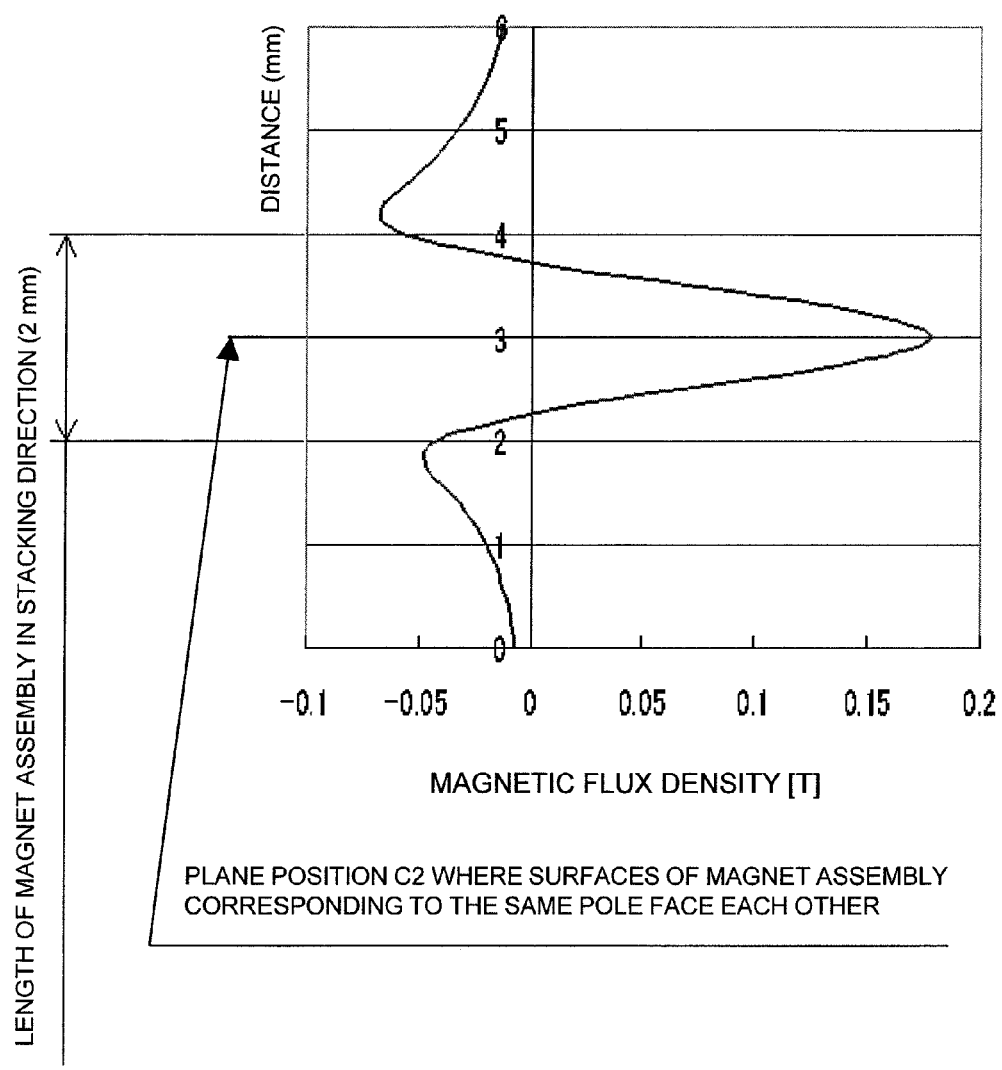
FIG. 3 is a view showing the distribution of the magnetic flux density of a magnet assembly.

FIG. 3 is a view showing the distribution of the magnetic flux density that is measured while a Hall element is moved in the stacking direction in the direction orthogonal to a cylindrical shaft. An assembly where an anisotropic samarium cobalt magnet of which the magnetic field is oriented in the stacking direction and a unit magnet which is magnetized in the stacking direction and has an outer diameter φ of 4.2 mm, an inner diameter 1.6 mm, and a thickness of 1 mm are stacked so that the surfaces of the magnets corresponding to the same pole face each other has been used as the magnet assembly. Meanwhile, a distance shown in FIG. 3 means the moving distance of the Hall element.

Due to the structure of the invention, the magnet assembly 3 has the maximum magnetic flux density at the plane position C2 where the unit magnet and the magnet face each other as shown in FIG. 3. Further, the plane position C2 where the magnetic flux density is at a maximum and the surfaces of the unit magnets face each other corresponds to the center of the solenoid coil 21 in the winding axis direction at the time of stop. The solenoid coil 21 generates an induced electromotive force when the magnet assembly 3 moves relative to from the position where the magnetic flux density is at a maximum. Accordingly, even though the moving distance is short, a large induced electromotive force can be generated.

FIG. 2 is a cross-sectional view of the electromagnetic generator when the electromagnetic generator operates. A total distance X is the sum of the maximum distance X1 of the magnet assembly 3 that moves toward the repulsive magnet 5 and the maximum distance X2 of the magnet assembly 3 that moves toward the repulsive magnet 4. As described above, the total distance X means the moving distance of the magnet assembly 3 that moves relative to the solenoid coil 21. L denotes the length of the solenoid coil 21 in the winding axis direction, and T denotes the length of the magnet assembly 3 in the stacking direction. In the electromagnetic generator 1 having the above-mentioned structure, it is preferable that X≤T×0.7−L be satisfied as shown in FIG. 2.

Figure 2A:
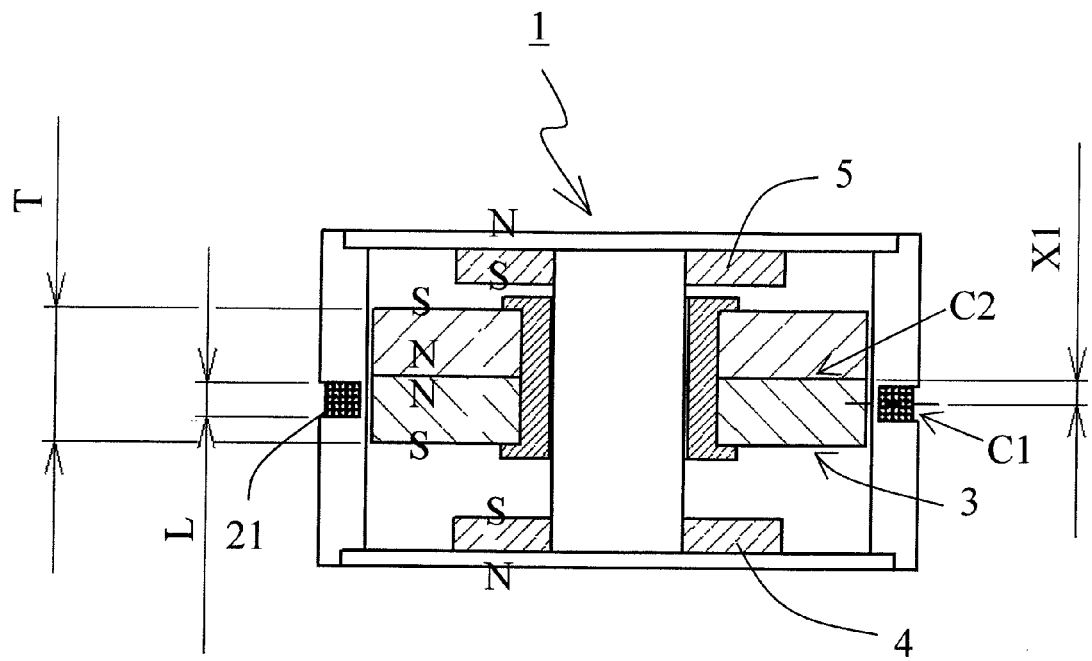
FIG. 2 is a cross-sectional view of the electromagnetic generator according to the first example of the invention when the electromagnetic generator operates.
Figure 2B:
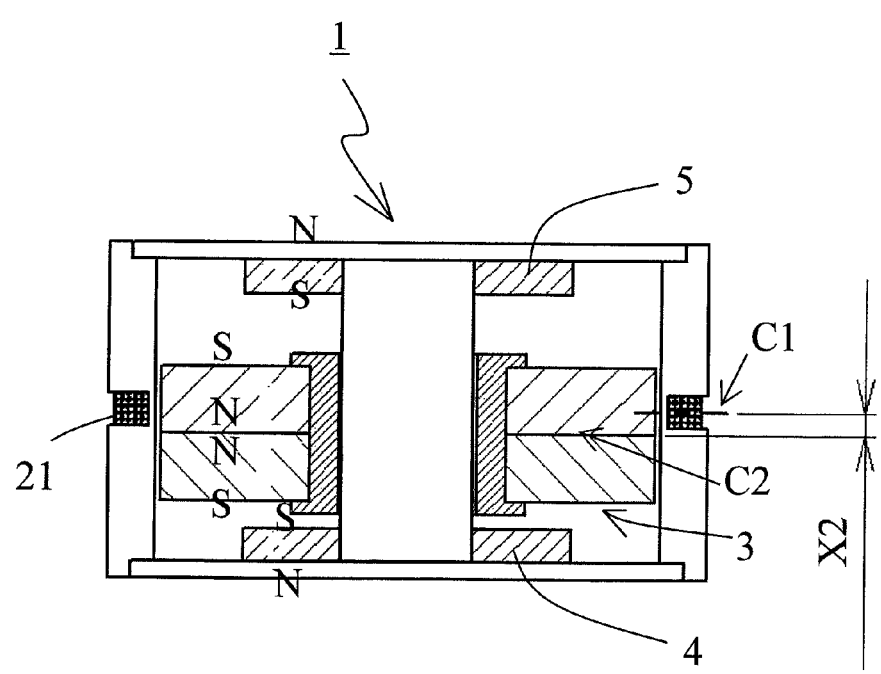

According to this structure, in FIG. 2A showing that the magnet assembly 3 moves closest to the repulsive magnet 5 and FIG. 2B showing that the magnet assembly 3 moves closest to the repulsive magnet 4, the solenoid coil 21 faces the magnet assembly 3 in the range of 70% of the length T of the magnet assembly 3 in the stacking direction. In the distribution of the magnetic flux density of the magnet assembly where the magnets are stacked so that the surfaces of the magnets corresponding to the same pole face each other, the magnetic flux of the magnetic pole of the surfaces of the magnets facing each other is present in the range of about 70% of the length of the magnet assembly in the stacking direction as shown in FIG. 4. Accordingly, even though the magnet assembly 3 moves by the maximum distance, the solenoid coil 21 faces a single magnetic pole and does not face the opposite magnetic pole, so that an induced electromotive force in the opposite direction is not generated. For this reason, a large induced electromotive force can be generated.

Figure 4A:
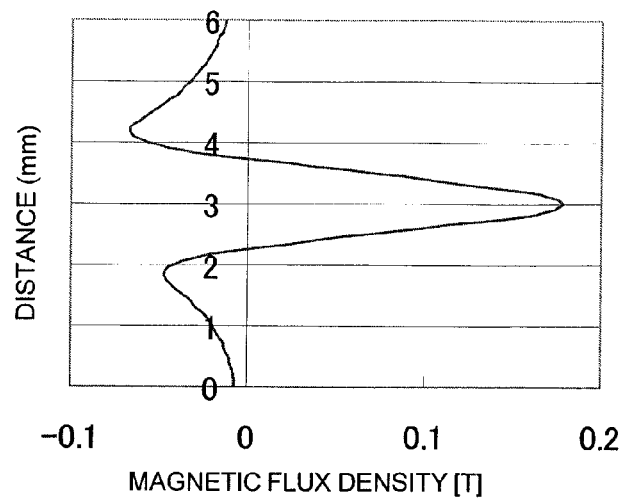
FIG. 4 is a view showing the distribution of the magnetic flux density of magnet assemblies having different thicknesses.
Figure 4B:
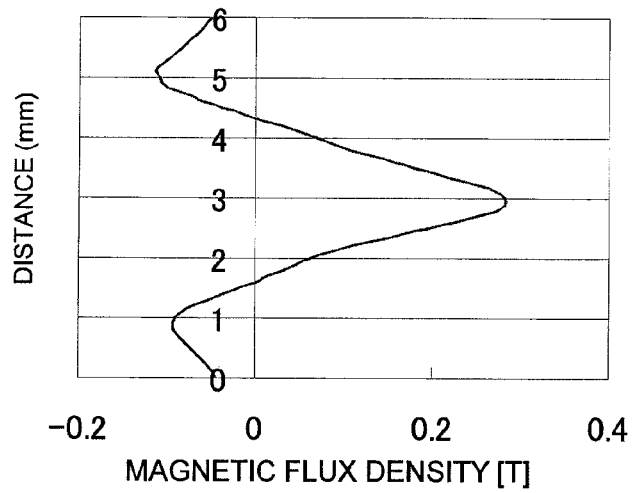
Figure 4C:
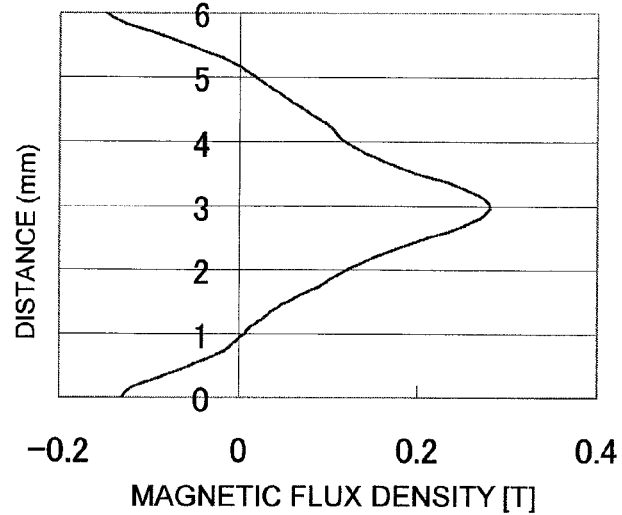

FIG. 4 is a view showing the distribution of the magnetic flux density of magnet assemblies 3 having different thicknesses. Specifically, FIG. 4 is a view showing the measurement results of magnetic flux density measured while a Hall element is moved in the same direction as FIG. 3 after anisotropic samarium cobalt magnets of which the magnetic field is oriented in the stacking direction are magnetized in the stacking direction and stacked so that the surfaces of the magnets corresponding to the same pole face each other. Meanwhile, a distance shown in FIG. 4 means the moving distance of the Hall element. Here, the unit magnets of the magnet assemblies 3 shown in FIGS. 4A to 4C have an outer shape φ of 4.2 mm and an inner diameter of 1.6 mm, and the thicknesses of the unit magnets are different from each other. For example, the thickness of the unit magnet in FIG. 4A is 1 mm, the thickness of the unit magnet in FIG. 4B is 2 mm, and the thickness of the unit magnet in FIG. 4C is 3 mm. A range where the polarity of the surfaces of the magnets corresponding to the same pole is distributed corresponds to 1.4 mm when the thickness of the unit magnet is 1 mm, corresponds to 2.7 mm when the thickness of the unit magnet is 2 mm, and corresponds to 4.1 mm when the thickness of the unit magnet is 3 mm. Further, a ratio of this range to the length of the magnet assembly in the stacking direction is 70% when the thickness of the unit magnet is 1 mm, is 68% when the thickness of the unit magnet is 2 mm, and is 68% when the thickness of the unit magnet is 3 mm. The magnetic flux of the same polarity is distributed in the range of about 70%. Accordingly, if a total length, which is the sum of the moving distance X of the magnet assembly and the length L of the solenoid coil 21 in the winding axis direction, is about 70% or less of the length of the magnet assembly in the stacking direction, an induced electromotive force in the opposite direction is not generated on the solenoid coil 21.

Figure 5:
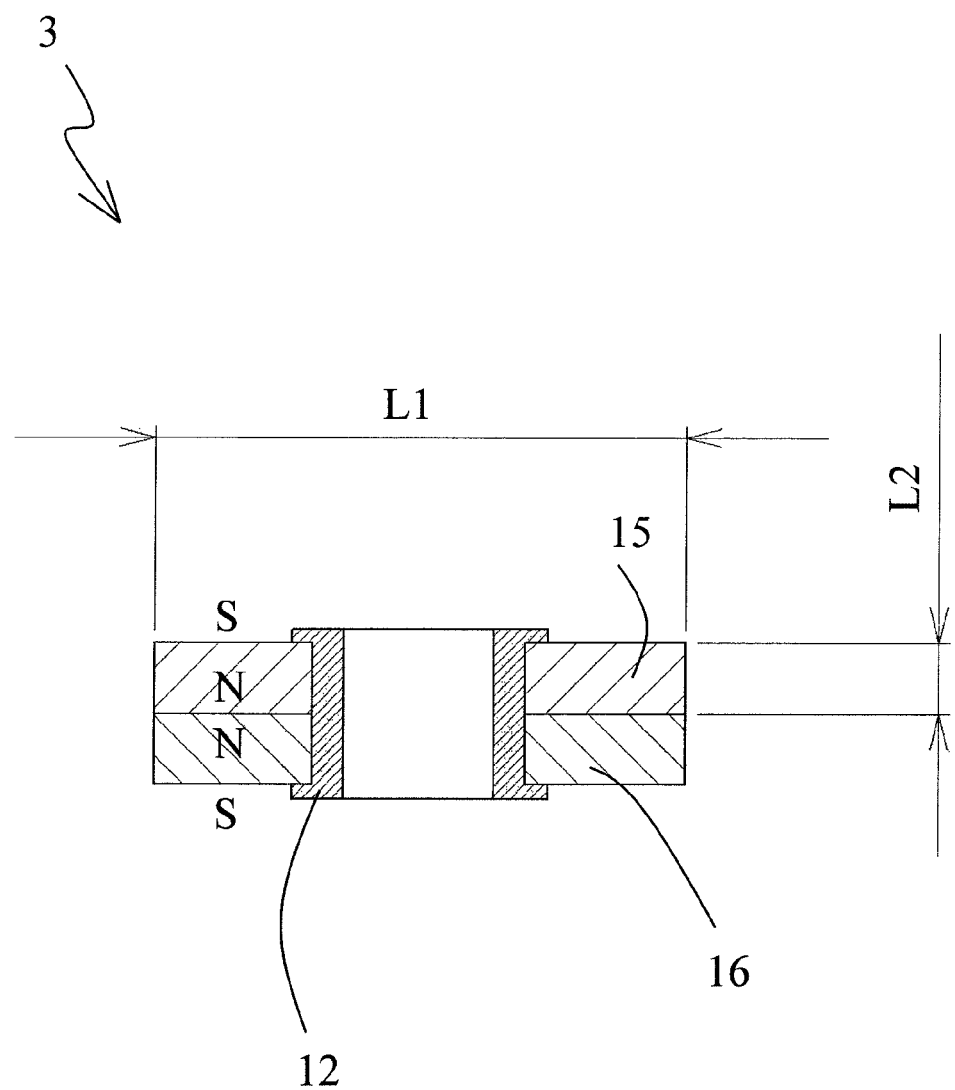
FIG. 5 is a cross-sectional view showing the length of the end face of a unit magnet in a direction perpendicular to a winding axis direction of a solenoid coil and the length of the solenoid coil in the winding axis direction.

FIG. 5 is a cross-sectional view showing the length of the end face of the unit magnet in a direction perpendicular to the winding axis direction of the solenoid coil 21 and the length of the solenoid coil 21 in the winding axis direction. As shown in FIG. 5, the length L1 of the unit magnets 15 and 16 in the direction perpendicular to the winding axis direction of the solenoid coil 21 may be equal to or larger than double the length L2 of the unit magnet in the winding axis direction. According to this structure, even though the magnet assembly 3 uses the repulsive magnets 4 and 5 having a small volume in the spring load between the repulsive magnets 4 and 5 that is set to a predetermined natural frequency, it is possible to increase the distance. For this reason, even though the amplitude of the magnet assembly is large at the time of resonance, the magnet assembly 3 does not come into contact with the repulsive magnets 4 and 5.

Figure 6:
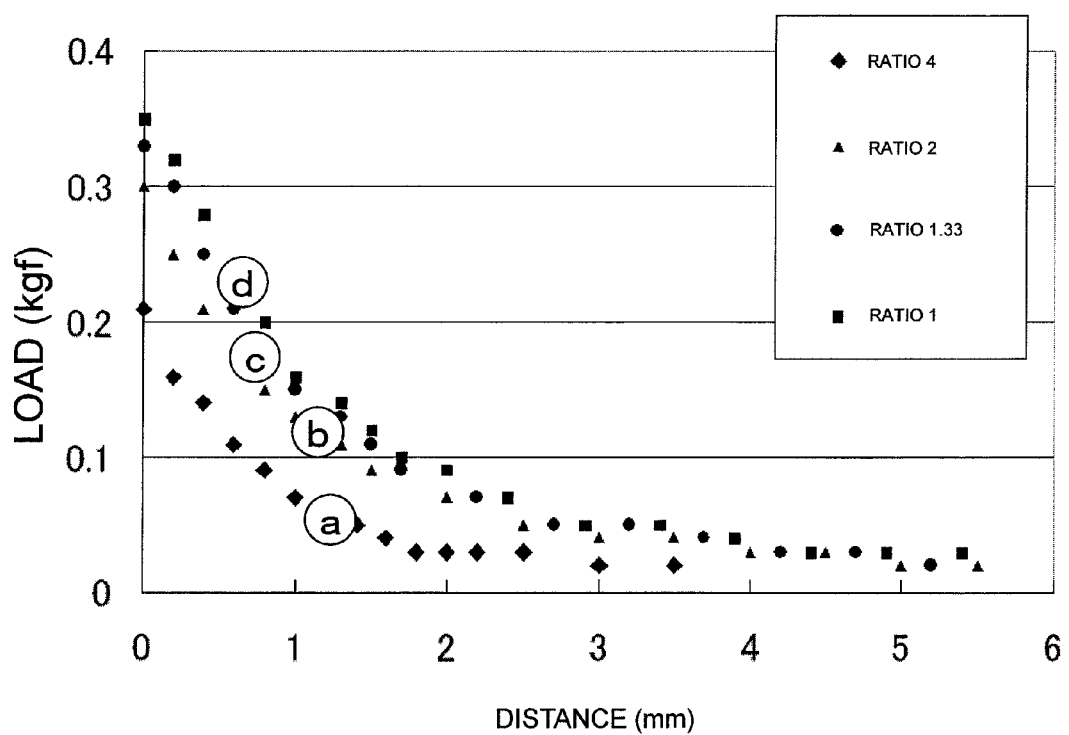
FIG. 6 is a view showing spring properties between repulsive magnets and magnet assemblies of which unit magnets have different lengths in an axial direction.

The reason why the distances between the magnet assembly 3 and the repulsive magnets 4 and 5 can be increased will be described with reference to FIGS. 6 and 7. FIG. 6 is a view showing loads that are measured while distances between magnet assemblies having different weights and the repulsive magnets are changed. FIG. 7 is a table of spring constants where natural frequencies without considering damping are obtained from magnet assemblies having different weights at a frequency of 60 Hz and a total amplitude of 1 mm by calculation. Further, since the damping coefficient of the magnet assembly of the electromagnetic generator of the invention is 0.1 or less, that is, small, a natural frequency with damping and a natural frequency without damping have substantially the same value. For this reason, a natural frequency without considering damping may be calculated. The magnet having been used is a neodymium sintered magnet of which the magnetic field is oriented in the stacking direction. The magnet assembly was formed by stacking unit magnets each of which has an outer diameter φ of 14 mm, an inner diameter φ of 3.3 mm, and a thickness of 3.5 mm. In the magnet assembly that is formed by stacking the unit magnets one by one so that the surfaces of the unit magnets corresponding to the same pole face each other, the length (L1) of the end face of the unit magnet in the direction perpendicular to the cylindrical shaft is 14 mm and the length (L2) of the unit magnet in the axial direction of the cylindrical shaft is 3.5 mm. Further, a ratio of the length of the end face of the unit magnet to the length of the unit magnet in the winding axis direction is 4. In a magnet assembly where a set of unit magnets is formed by stacking two unit magnets so that the surfaces of the two unit magnets corresponding to different poles face each other and two sets of unit magnets are stacked so that the surfaces of the unit magnets corresponding to the same pole face each other, a ratio of the length of the end face of the unit magnet to the length of the magnet assembly in the winding axis direction is 2. Likewise, a ratio of the length of the end face of the unit magnet of a magnet assembly, in which three unit magnets are stacked as a set of unit magnets, to the length of the magnet assembly in the winding axis direction is 1.33. Likewise, a ratio of the length of the end face of the unit magnet of a magnet assembly, in which four unit magnets are stacked, to the length of the magnet assembly in the winding axis direction is 1. The spring properties of four sets of magnet assemblies were measured and the spring loads of the magnet assemblies were calculated. A repulsive magnet, which is used in the measurement of the spring property, is a neodymium sintered magnet which has an outer diameter φ of 8.5 mm, an inner diameter φ of 5.5 mm, and a thickness of 0.9 mm and of which the magnetic field is oriented in the thickness direction.

As for the spring properties of FIG. 6, the spring property of the magnet assembly where a ratio of the length of the end face of the unit magnet to the length of the magnet assembly in the winding axis direction (hereinafter, referred to as a "ratio") is 4 is significantly different from the spring property of the magnet assembly where the ratio is 2. A spring in the case of a ratio of 2 becomes significantly stronger than that in the case of a ratio of 4. The spring properties in the cases of a ratio of 1.33 and a ratio of 1 are not significantly different from the spring property in the case of a ratio of 2, and slightly become strong. Curves a, b, c, and d shown in FIG. 6 are obtained by plotting spring constants, which are obtained from the respective four sets of magnet assemblies at a natural frequency of 60 Hz and a total amplitude of 1 mm by calculation, on a graph. The distance in the case of a ratio of 4 and the distance in the case of a ratio of 2 are 1 mm or more and are substantially equal to each other, but the curve in the case of a ratio of 1.33 and the curve in the case of a ratio of 1 are shifted in a direction where the distance is shortened. From this, it is known that the long distance can be secured between the repulsive magnet and the magnet assembly when the length of the end face of the unit magnet is equal to or larger than double the length of the unit magnet in the winding axis direction.

Next, the characteristics of spring properties, which were obtained by experiments, were guessed by measuring the surface magnetic flux of the end face portion of the magnet assembly as grounds.

Figure 8:
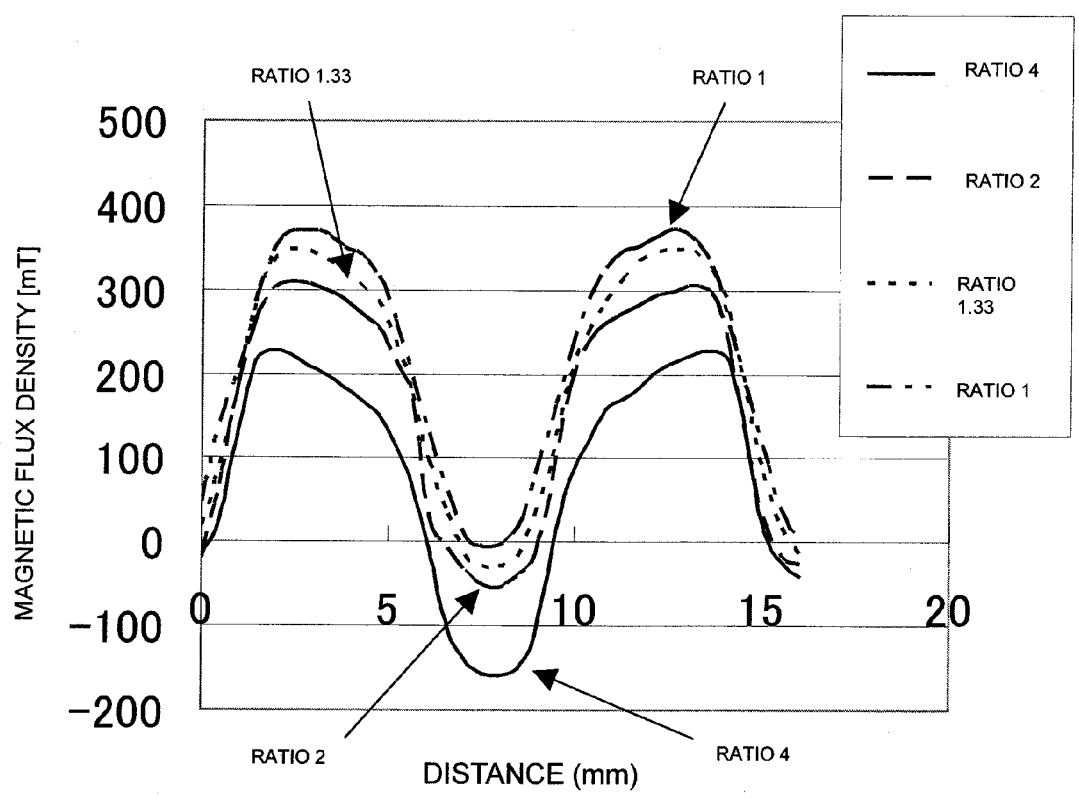
FIG. 8 is a view showing the distribution of the magnetic flux density of end face portions of magnet assemblies having different thicknesses.

FIG. 8 is a view showing the distribution of the magnetic flux density of end face portions of the four sets of magnet assemblies corresponding to the ratio of 4 to 1. The measurement of magnetic flux density was performed while a Hall element is moved from one end portion of the magnet assembly to the other end portion thereof on the center axis of the circular end face of the magnet assembly. Magnetic flux density is significantly increased in a ratio of 2 from a ratio of 4, but an increase of magnetic flux density is reduced from a ratio of 2 to a ratio of 1.33 and a ratio of 1. From this, it is guessed that a spring becomes significantly strong in a ratio of 2 from a ratio of 4 and springs of a ratio of 2 to a ratio of 1.33 and a ratio of 1 become slightly strong.

Figure 9:
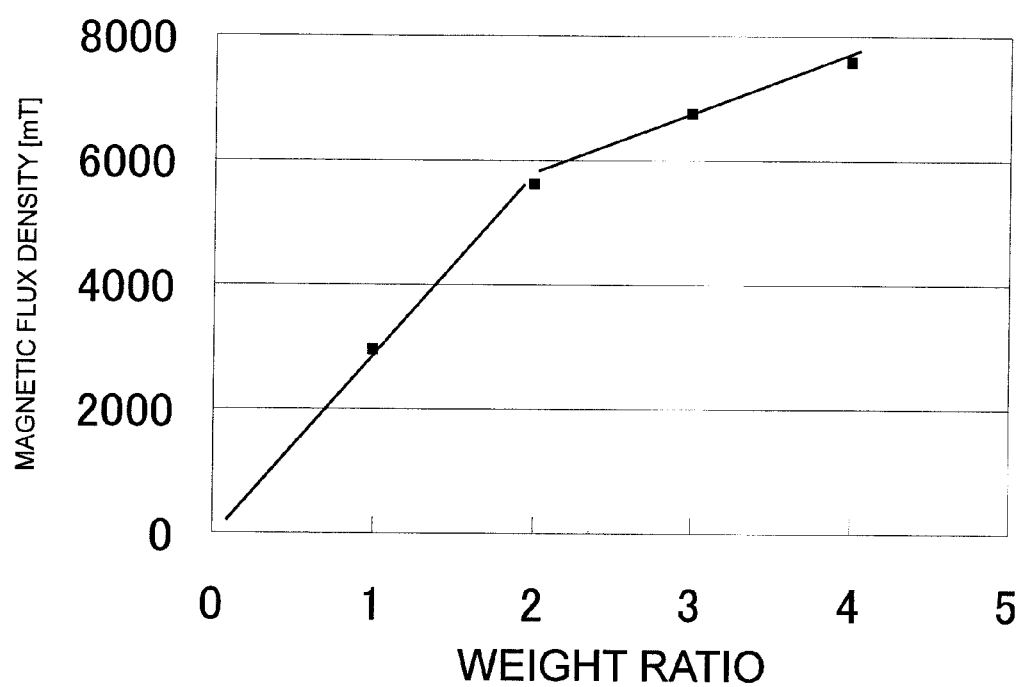
FIG. 9 is a view showing weight ratios of magnet assemblies having different thicknesses and the magnetic flux density of end face portions of the magnet assemblies.

Further, FIG. 9 shows a weight ratio when the weight of the magnet assembly of a ratio of 4 is assumed as 1 and magnetic flux density that is obtained as the sum of the measured magnetic flux density. Magnetic flux density is increased in proportion to weight when a weight ratio is equal to or smaller than 2. However, since the inclination of a graph is reduced when a weight ratio is in the range of 2 to 4, the increase of magnetic flux density is smaller than the increase of weight.

Accordingly, when a ratio is equal to or smaller than 2, the magnetic flux density of the end face portion is also increased in proportion to the increase of the length in the winding axis direction. However, even though the length in the winding axis direction is increased so that a ratio exceeds 2, the magnetic flux density of the end face portion is increased at a rate smaller than the increase of the length. From this, since a spring also becomes strong substantially in proportion to the increase of the weight of the magnet when a ratio is equal to or smaller than 2, it is possible to obtain a necessary spring load without changing the distance between the magnet assembly and the repulsive magnet. However, since the spring strength corresponding to the increase of weight is not obtained even though the size of the magnet in the axial direction of the cylindrical shaft is increased so that a ratio exceeds 2, it is guessed that the distance between the magnet assembly and the repulsive magnet should be reduced to obtain a necessary spring load.

The housings 23 and 24 and the unit magnets 15 and 16 may not be discs and may be polygonal plates. Further, the repulsive magnets 4 and 5 and the unit magnets 15 and 16 may not include holes and may not include the guide bar 11 and the magnet holder 12.

Modification of First Example

Figure 10:
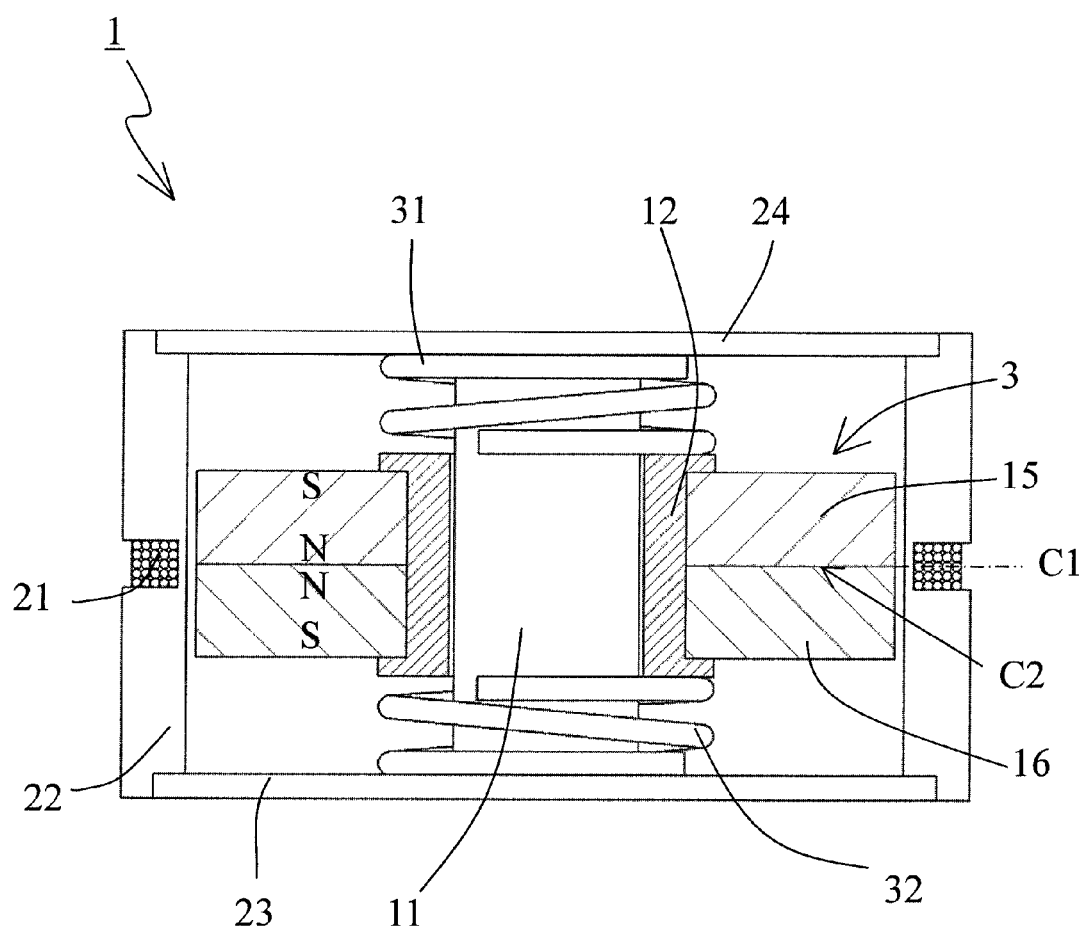
FIG. 10 is a cross-sectional view of an electromagnetic generator of the invention.

FIG. 10 shows a modification of the electromagnetic generator 1 according to the first example.

The magnet assembly 3 may be connected to the housings 23 and 24 by elastic bodies 31 and 32 such as coil springs instead of the repulsive magnets 4 and 5. The electromagnetic generator 1 may be adapted so that the magnet assembly 3 can linearly reciprocate along the guide bar 11 when the elastic bodies 31 and 32 expand and contract due to vibration.

According to this structure, at the time of stop, the center C1 of the solenoid coil 21 in the winding axis direction corresponds to a position where magnetic flux density is at a maximum on the plane C2 where the surfaces of the unit magnets 15 and 16 of the magnet assembly 3 corresponding to the same pole face each other. Accordingly, the magnet assembly 3 reciprocates relative to the solenoid coil 21 from the position where the magnetic flux density is at a maximum. For this reason, a large induced electromotive force can be generated.

Second Example

Figure 11:
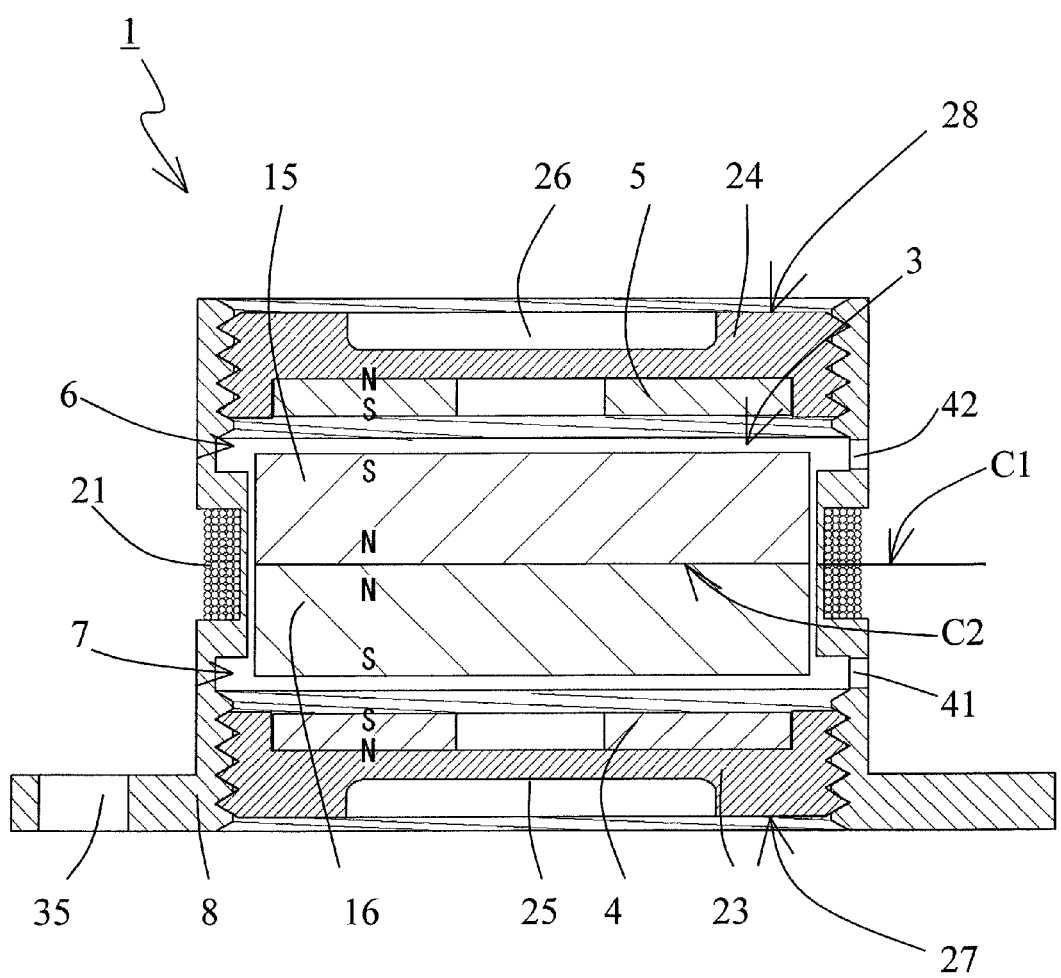
FIG. 11 is a cross-sectional view of an electromagnetic generator according to a second example of the invention.
Figure 12:
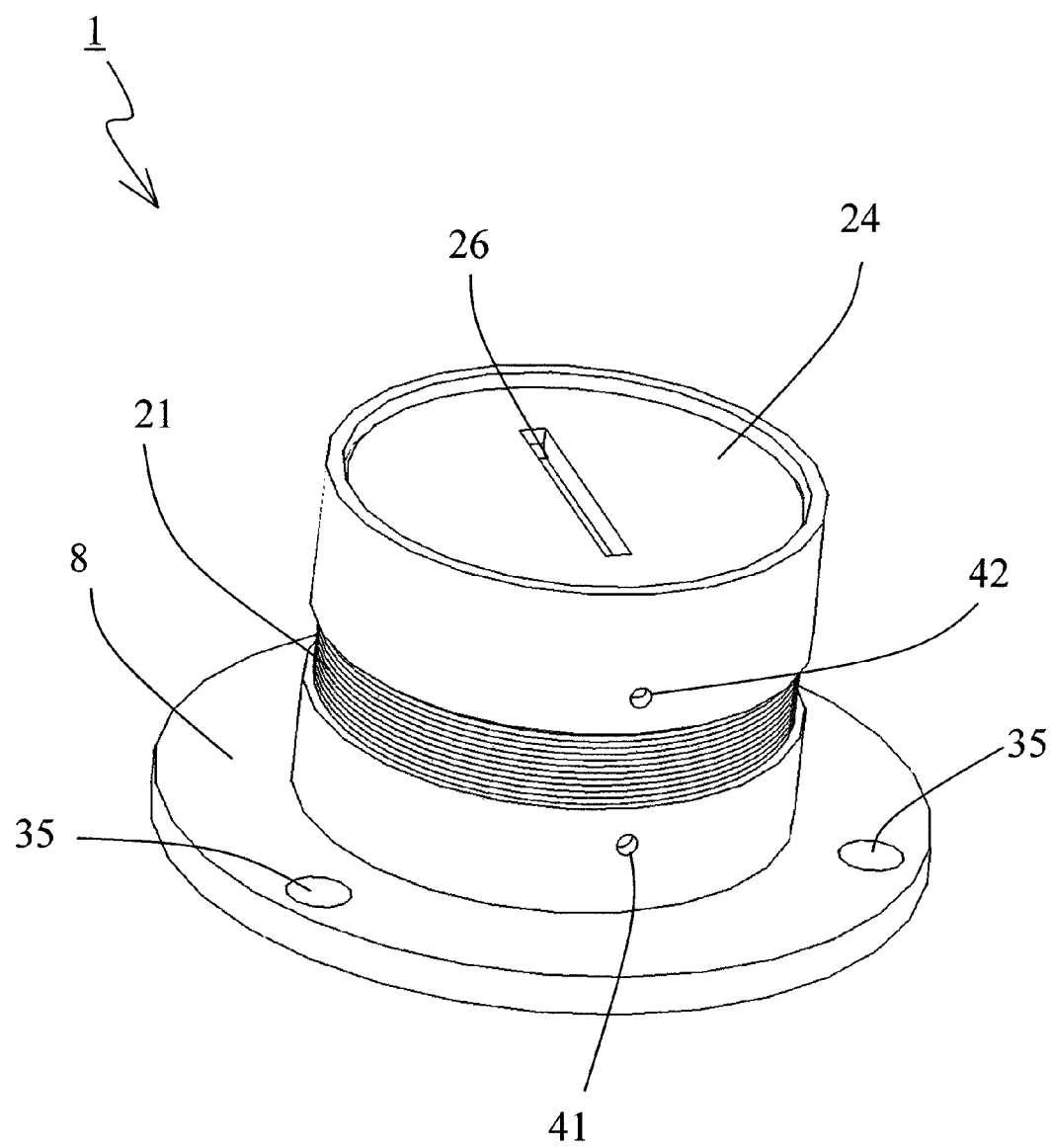
FIG. 12 is a perspective view of the electromagnetic generator according to the second example of the invention.

FIGS. 11 and 12 show an electromagnetic generator 1 according to a second example.

As shown in FIG. 11, the electromagnetic generator 1 includes a magnet assembly 3, holding parts 27 and 28 that hold the magnet assembly 3 in a moving direction, a case 8 that receives the holding parts 27 and 28, and a solenoid coil 21 that generates electric power by an electromagnetic induction action between the magnet assembly 3 and the solenoid coil.

The holding parts 27 and 28 include housings 23 and 24 and repulsive magnets 4 and 5. Moreover, the holding parts 27 and 28 include a distance adjusting mechanism that adjusts the distances between the magnet assembly 3 and the holding parts 27 and 28. Specifically, the housings 23 and 24 include male screws formed on the outer peripheries thereof, recesses that receive repulsive magnets 4 and 5, and grooves 25 and 26 into which an end of a tool such as a flat-bladed screwdriver is fitted. The housings 23 and 24 can be moved in the axial direction of the screw by the male screws of the housings 23 and 24 and the female screw of the inner peripheral surface of the case by being rotated by a tool such as a flat-bladed screwdriver.

The repulsive magnets 4 and 5 are fixed to the housings 23 and 24 by bonding so that the surfaces of the repulsive magnets corresponding to the same pole as the pole of the surfaces of the magnet assembly 3 facing the repulsive magnets face the magnet assembly 3.

The surfaces of unit magnets 15 and 16, which face the repulsive magnets 4 and 5, are magnetized to an S pole and the other surfaces of the unit magnets are magnetized to an N pole. The surfaces of the magnet assembly 3 facing the repulsive magnets 4 and 5 correspond to the same pole. Accordingly, when approaching the repulsive magnet 4 or 5, the magnet assembly 3 is repelled by the repulsive magnet 4 or 5 and is moved in a direction where the magnet assembly 3 is separated from the repulsive magnet 4 or 5.

The case 8 is formed of a non-magnetic body, and is preferably made of a non-conductive material such as a resin (PPS or the like). A groove in which the solenoid coil 21 is received is formed on the middle of a body portion of the case 8. When the magnet assembly 3 is separated from the repulsive magnets 4 and 5 by the magnetic forces of the repulsive magnets 4 and 5 and stops without external vibration, a center C1 of the groove, in which the solenoid coil 21 is received, in the axial direction of the case 8 substantially corresponds to a plane position C2 where the surfaces corresponding to the same pole face each other.

The solenoid coil 21 is wound in the circumferential direction in the groove that is formed on the middle of the body portion of the case 8. Since the center C1 of the groove of the case 8 in the axial direction of the case substantially corresponds to a plane C2 where the surfaces of the stopped magnet assembly corresponding to the same pole face each other, the center of the solenoid coil 21 in a winding axis direction also corresponds to the center C1 and substantially corresponds to the plane position C2 where the surfaces of the stopped magnet assembly corresponding to the same pole face each other.

The case 8 of the electromagnetic generator 1 having the above-mentioned structure is fixed to an electric motor or the like by a mounting portion 35. Accordingly, when the electric motor or the like is rotated, a body of the electric motor vibrates due to the imbalance of a rotor or the like. As a result, the electromagnetic generator 1 vibrates. Further, the distances between the magnet assembly 3 and the repulsive magnets 4 and 5 are adjusted by rotating the housings 23 and 24 so that the vibration frequency of the electric motor or the like and the natural frequency of the magnet assembly 3 in the moving direction of the magnet assembly 3 correspond to each other. As a result, the magnet assembly 3 resonates and vibrates. The magnet assembly 3 linearly reciprocates in the axial direction of the case 8 due to vibration, so that an induced electromotive force is generated on the solenoid coil 21 provided on the outer periphery.

According to this structure, the magnet assembly 3 has the maximum magnetic flux density at the plane position where the unit magnets face each other as shown in FIG. 3, the plane position where the magnetic flux density is at a maximum and the surfaces of the unit magnets face each other corresponds to the center of the solenoid coil 21 in the winding axis direction at the time of stop, and the solenoid coil 21 generates an induced electromotive force by moving relative to the magnet assembly 3 from the position where the magnetic flux density is maximum. Accordingly, even though the moving distance is short, a large induced electromotive force can be generated.

Further, since the repulsive magnets 4 and 5 can be moved in the axial direction of the screw by the male screws of the housings 23 and 24 and the female screw of the inner peripheral surface of the case by rotating the housings 23 and 24 with a tool such as a flat-bladed screwdriver, it is possible to adjust the distances between the housings 23 and 24 and the magnet assembly 3. Since a relationship between a distance and a load is a relationship where a load exponentially changes relative to a distance as shown in FIG. 6, it is possible to set the distances between the repulsive magnets 4 and 5 and the magnet assembly 3 to spring constants, of which inclination is significantly different, by slightly adjusting a distance. Accordingly, since it is possible to change the natural frequency of the magnet assembly 3 in the moving direction of the magnet assembly 3 to a wide frequency range by slightly changing a distance, it is possible to reduce the thickness of the electromagnetic generator. Moreover, since it is possible to finely adjust a distance by the rotation of a screw, it is possible to accurately adjust the natural frequency of the magnet assembly 3 in the moving direction of the magnet assembly 3 according to the frequency of external vibration and the magnet assembly 3 can move relative to the solenoid coil 21 at very high speed by resonance. For this reason, a large induced electromotive force can be generated.

In the electromagnetic generator 1 having the above-mentioned structure, communication holes 41 and 42 through which air chambers 6 and 7 formed between the magnet assembly 3, the holding parts 27 and 28, and the case 8 communicate with the atmosphere is preferably formed at the case 8.

According to this structure, when the magnet assembly 3 is moved toward one repulsive magnet, air can flow out of and into one air chamber of which the volume is reduced and the other air chamber of which the volume is increased, through the communication holes. For this reason, since the flow of air, which passes through a narrow passage formed between the outer peripheral surface of the magnet assembly 3 and the case 8, can be reduced, a damping coefficient that allows the vibration of the magnet assembly 3 to be damped can be reduced. A resonance response magnification Q of the magnet assembly 3 relative to the input of external vibration is generally given as "Q=½ζ". That is, since the maximum response at the time of resonance is a reciprocal of the double of a damping coefficient ζ, the damping, which is caused by the air flowing through a narrow passage, can be reduced. Accordingly, a resonance response magnification Q is increased, so that the magnet assembly can move relative to the solenoid coil at very high speed. For this reason, a large induced electromotive force can be generated. However, the communication holes 41 and 42 may not be formed at the case 8 and may be formed at the housings 23 and 24.

FIG. 12 is a perspective view of the electromagnetic generator of FIG. 11. However, the case 8 may be formed in a cylindrical shape as shown in FIG. 12, and may be formed in a prismatic shape. Accordingly, the housings 23 and 24 and the unit magnet 15 of FIG. 12 may not be discs and may be polygonal plates so as to correspond to the shape of the case 8. When a plurality of electromagnetic generators 1 are to be installed if the unit magnet 15 is a polygonal plate and the electromagnetic generator 1 is a prism of which the shape is the same as the shape of the unit magnet 15, it is possible to install the electromagnetic generators without forming useless spaces between the electromagnetic generators. Accordingly, power generation efficiency per the installation range of the electromagnetic generator is improved.

First Modification of Second Example

Figure 13:
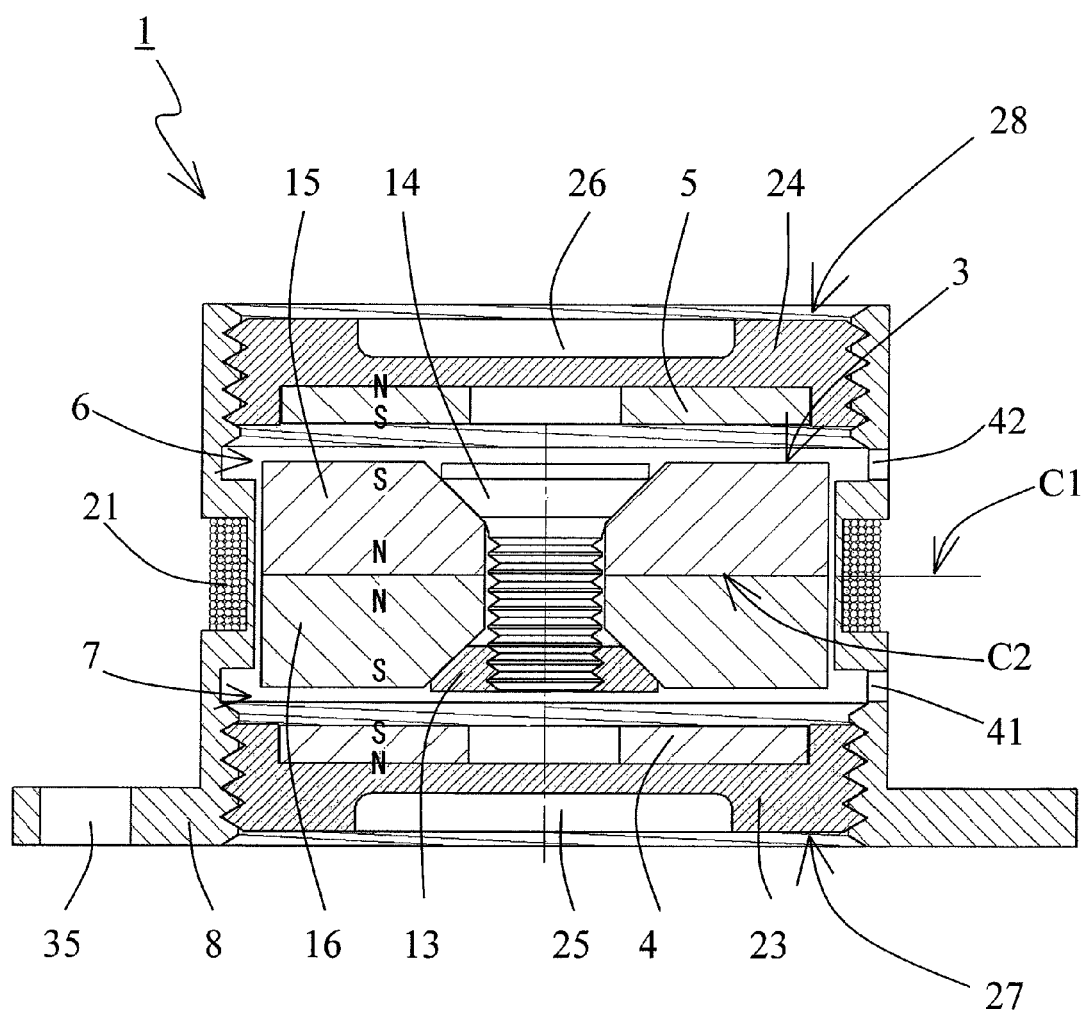
FIG. 13 is a cross-sectional view of an electromagnetic generator according to a first modification of the second example of the invention.

FIG. 13 shows an electromagnetic generator 1 according to a first modification of the second example.

Components common to the second example shown in FIG. 11 are denoted by the same reference numerals, and the description thereof will be omitted.

A first modification of the second example is different from the second example in that a magnet assembly 3 is formed by fastening the unit magnets 15 and 16 with a cross-recessed flat head screw 14 and a nut 13.

The repulsive magnets 4 and 5 are fixed to the housings 23 and 24 by bonding so that the surfaces of the repulsive magnets corresponding to the same pole as the pole of the surfaces of the magnet assembly 3 facing the repulsive magnets face the magnet assembly 3.

The unit magnets 15 and 16 are magnets with countersinks each of which includes a center hole and a conic chamfer formed at one end of the hole. The cross-recessed flat head screw 14 and the nut 13 are fitted to the center holes of the unit magnets 15 and 16 and the cross-recessed flat head screw 14 is fastened to the nut 13, so that the magnet assembly 3 is formed. The surfaces of the unit magnets 15 and 16, which face the holding parts, are magnetized to an S pole and the other surfaces of the unit magnets are magnetized to an N pole. It is possible to easily form the magnet assembly 3 by integrating the surfaces of the unit magnets 15 and 16 that repel each other.

Second Modification of Second Example

Figure 14:
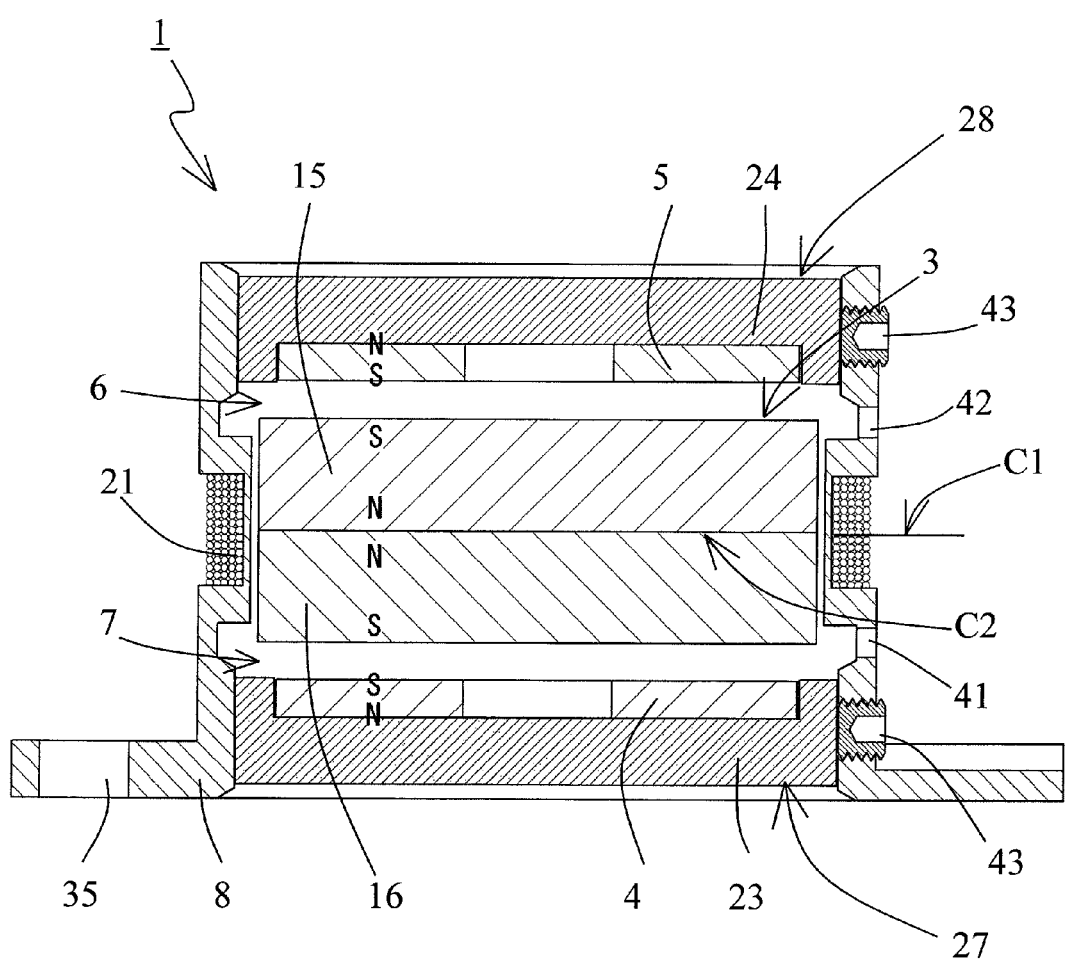
FIG. 14 is a cross-sectional view of an electromagnetic generator according to a second modification of the second example of the invention.

FIG. 14 shows an electromagnetic generator 1 according to a second modification of the second example.

Components common to the second example shown in FIG. 11 are denoted by the same reference numerals, and the description thereof will be omitted.

A second modification of the second example is different from the second example in terms of a distance adjusting mechanism that adjusts the distances between a magnet assembly 3 and holding parts 27 and 28.

The holding parts 27 and 28 include housings 23 and 24 and repulsive magnets 4 and 5. Moreover, the housings 23 and 24 are fastened by penetration screws 43 that penetrate in the direction perpendicular to the axial direction of the case 8. When the penetration screws 43 are loosened, it is possible to move the housings 23 and 24 in the axial direction of the case.

Third Modification of Second Example

Figure 15:
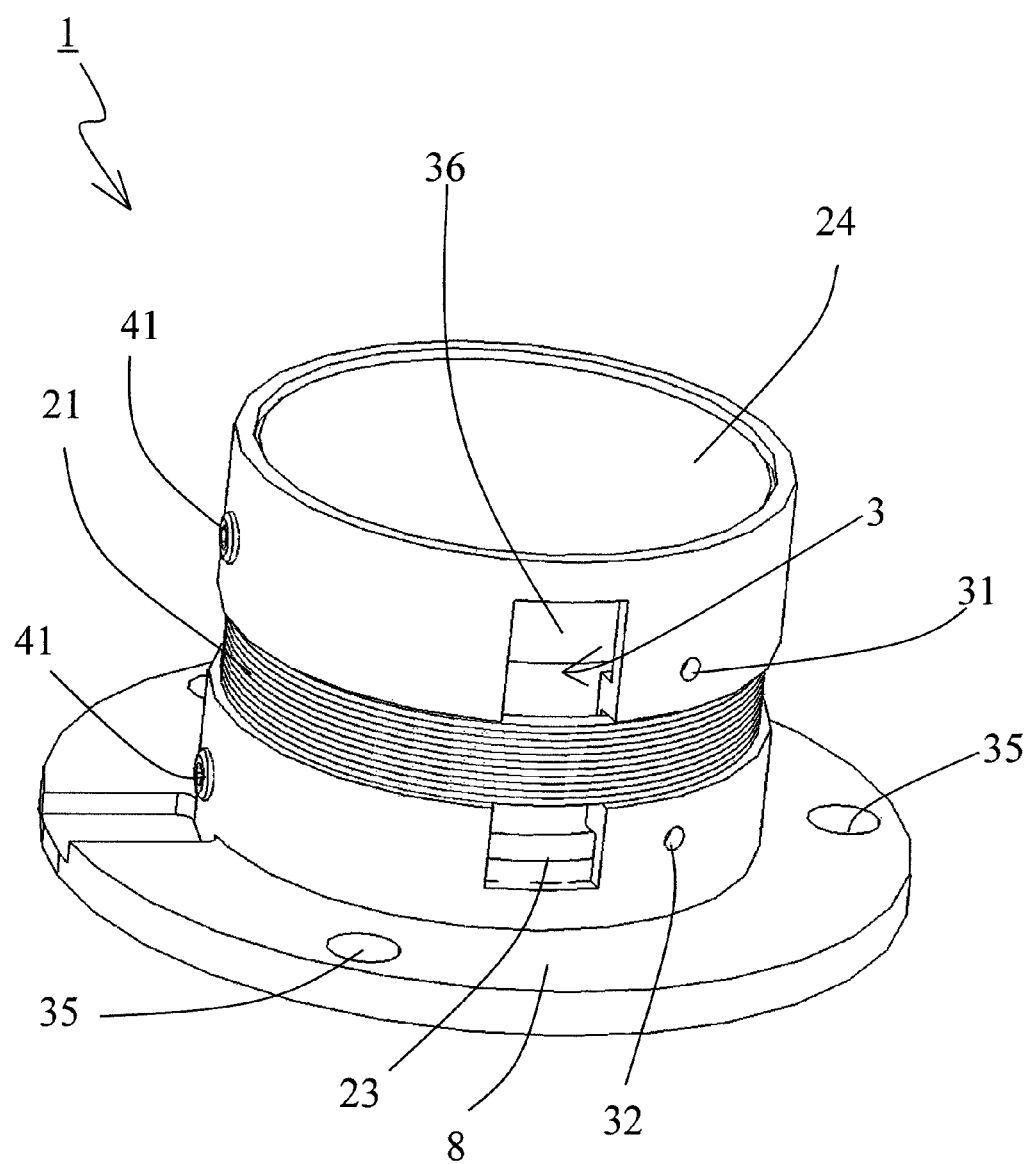
FIG. 15 is a perspective view of an electromagnetic generator according to a third modification of the second example of the invention.

FIG. 15 shows an electromagnetic generator 1 according to a third modification of the second example.

Components common to the second example shown in FIG. 11 are denoted by the same reference numerals, and the description thereof will be omitted.

A third modification of the second example is different from the second example in that a case portion 8 includes a position-confirmation portion 36 through which the position of the magnet assembly 3 can be confirmed. The position-confirmation portion 36 is adapted so that the inside of the case 8 can be visually seen through the position-confirmation portion 36. Accordingly, it is possible to move the housings 23 and 24 in the axial direction of the case 8 while visually confirming the position of the magnet assembly 3. Further, if graduations or the like are formed on the position-confirmation portion 36, it is possible to more accurately confirm the position of the magnet assembly 3. Accordingly, it is possible to more accurately adjust the distances between the magnet assembly 3 and the repulsive magnets 4 and 5 of the housings 23 and 24.

Third Example

Figure 16:
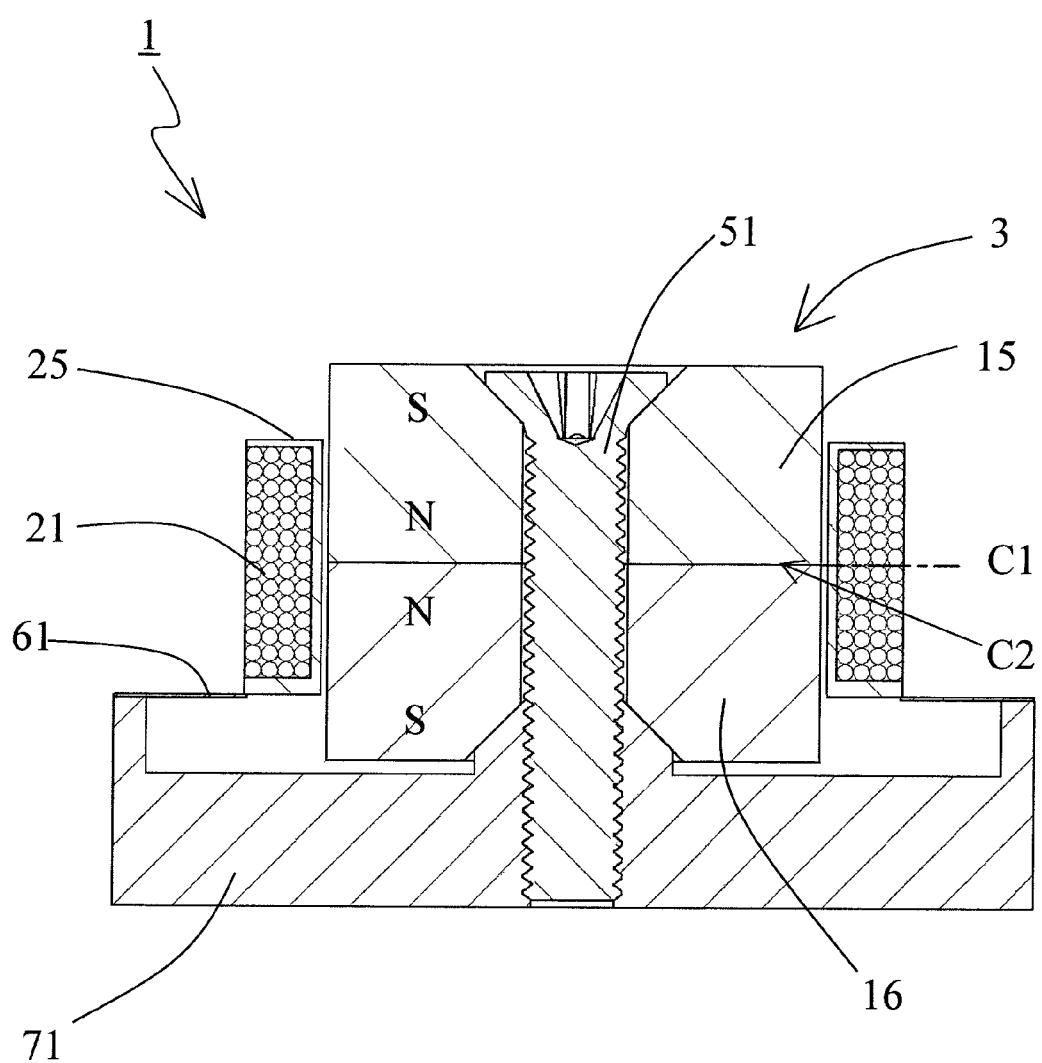
FIG. 16 is a cross-sectional view of an electromagnetic generator according to a third example of the invention.
Figure 17:
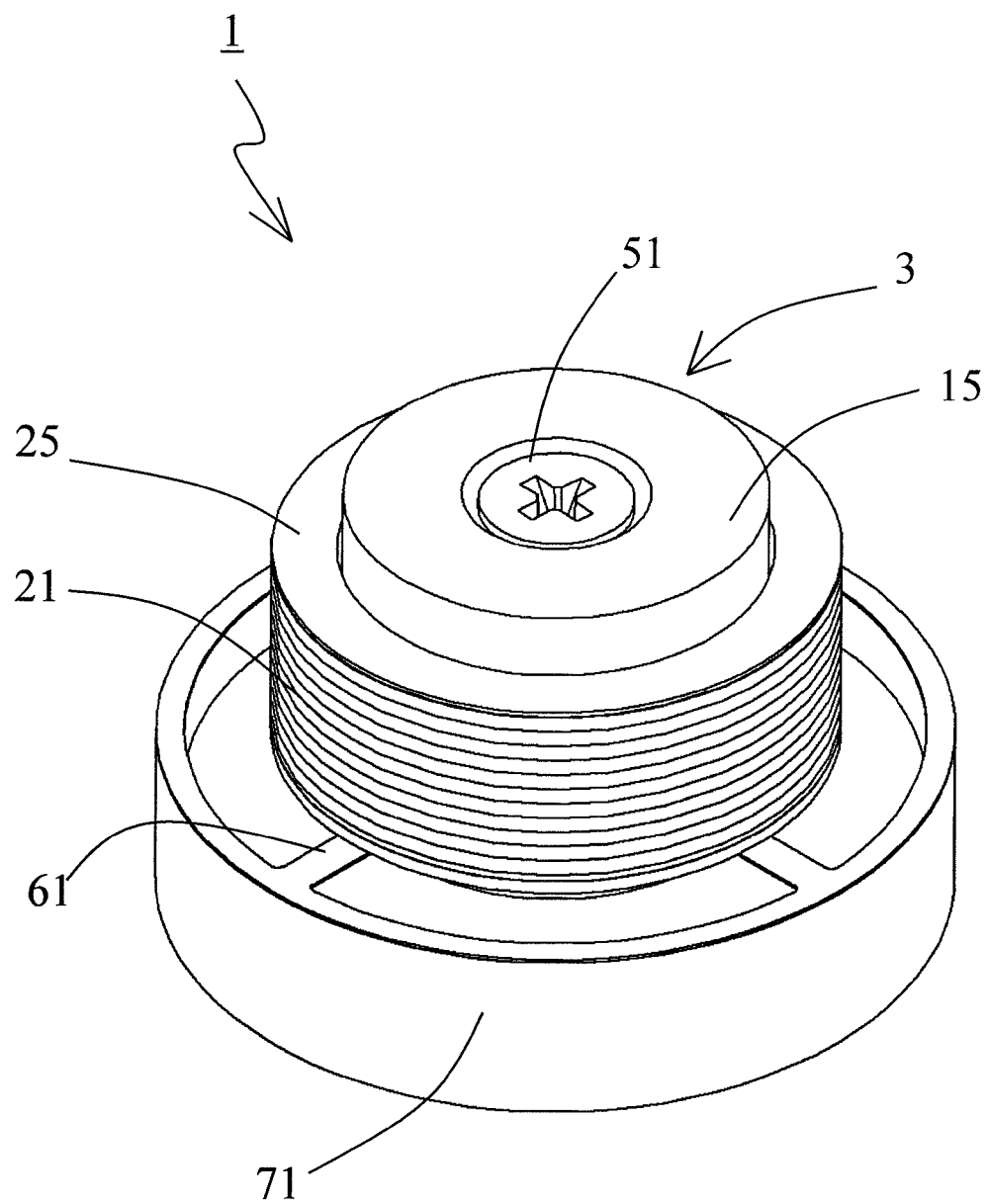
FIG. 17 is a perspective view of the electromagnetic generator according to the third example of the invention.

FIGS. 16 and 17 show an electromagnetic generator 1 according to a third example.

As shown in FIG. 16, the electromagnetic generator 1 includes a housing 71, a magnet assembly 3 that is fixed to the housing 71 by a cross-recessed flat head screw 51, a solenoid coil 21 that is wound on a coil bobbin 25, and a holding part 61 that holds the solenoid coil 21 in the moving direction.

The housing 71 is made of a non-magnetic material, and includes a convex portion which is formed at the center thereof and with which a conic chamfer portion of the magnet assembly 3 comes into contact, and a screw hole to which the cross-recessed flat head screw 51 is fitted. The housing 71 includes a cylindrical portion which is formed on the outer periphery and on which the holding part 61 is mounted.

The unit magnets 15 and 16 are fastened by the recessed flat head screw 51 and the housing 71, so that the magnet assembly 3 is formed. The unit magnets 15 and 16 are magnets with countersinks each of which includes a center hole and a conic chamfer formed at one end of the hole. The cross-recessed flat head screw 5 passes through the center holes of the unit magnets 15 and 16 and is fastened to a screw hole of the housing 24, so that the magnet assembly 3 is formed. The surfaces of the unit magnets 15 and 16, which face each other, are magnetized to an N pole and the other surfaces of the unit magnets are magnetized to an S pole.

The holding part 61 is a leaf spring that is made of, for example, SUS304. A base end portion of the holding part 61 is fixed to the cylindrical portion that is formed on the outer periphery of the housing 71, and an end portion of the holding part 61 is fixed to the coil bobbin 25. A spring load of the holding part 61 is set so that the coil bobbin 25 and the solenoid coil 71 resonate due to external vibration.

The coil bobbin 25 is made of a non-magnetic material, and is preferably made of a non-conductive material such as a resin (PPS or the like). The solenoid coil 21 is wound on the coil bobbin 25 in the circumferential direction. A center C1 of the solenoid coil 21 in a winding axis direction substantially corresponds to a plane position C2 where the surfaces of the magnet assembly 3 corresponding to the same pole face each other when the magnet assembly stops without external vibration.

The housing 71 of the electromagnetic generator 1 having the above-mentioned structure is fixed to an electric motor or the like. Further, when the electric motor is rotated, a body of the electric motor vibrates due to the imbalance of a rotor or the like. As a result, the electromagnetic generator 1 vibrates. The vibration of the housing 71 is transmitted to the coil bobbin 25 from the holding part 61. A spring load of the holding part 61 is set so that the coil bobbin 25 and the solenoid coil 21 resonate with the frequency of external vibration, the solenoid coil 21 resonates and vibrates in the winding axis direction with an amplitude larger than the amplitude of the external vibration. Accordingly, the solenoid coil 21 moves relative to the magnet assembly 3, so that an induced electromotive force is generated on the solenoid coil 21.

According to this structure, the magnet assembly 3 has the maximum magnetic flux density at the plane position C2 where the unit magnets face each other as shown in FIG. 3, the plane position C2 where the magnetic flux density is at a maximum and the surfaces of the unit magnets face each other corresponds to the center C1 of the solenoid coil 21 in the winding axis direction at the time of stop, and the solenoid coil 21 generates an induced electromotive force by moving relative to the magnet assembly 3 from the position where the magnetic flux density is at a maximum. Accordingly, even though the moving distance is short, a large induced electromotive force can be generated.

FIG. 17 is a perspective view of an electromagnetic generator of FIG. 16.

First Modification of Third Example

Figure 18:
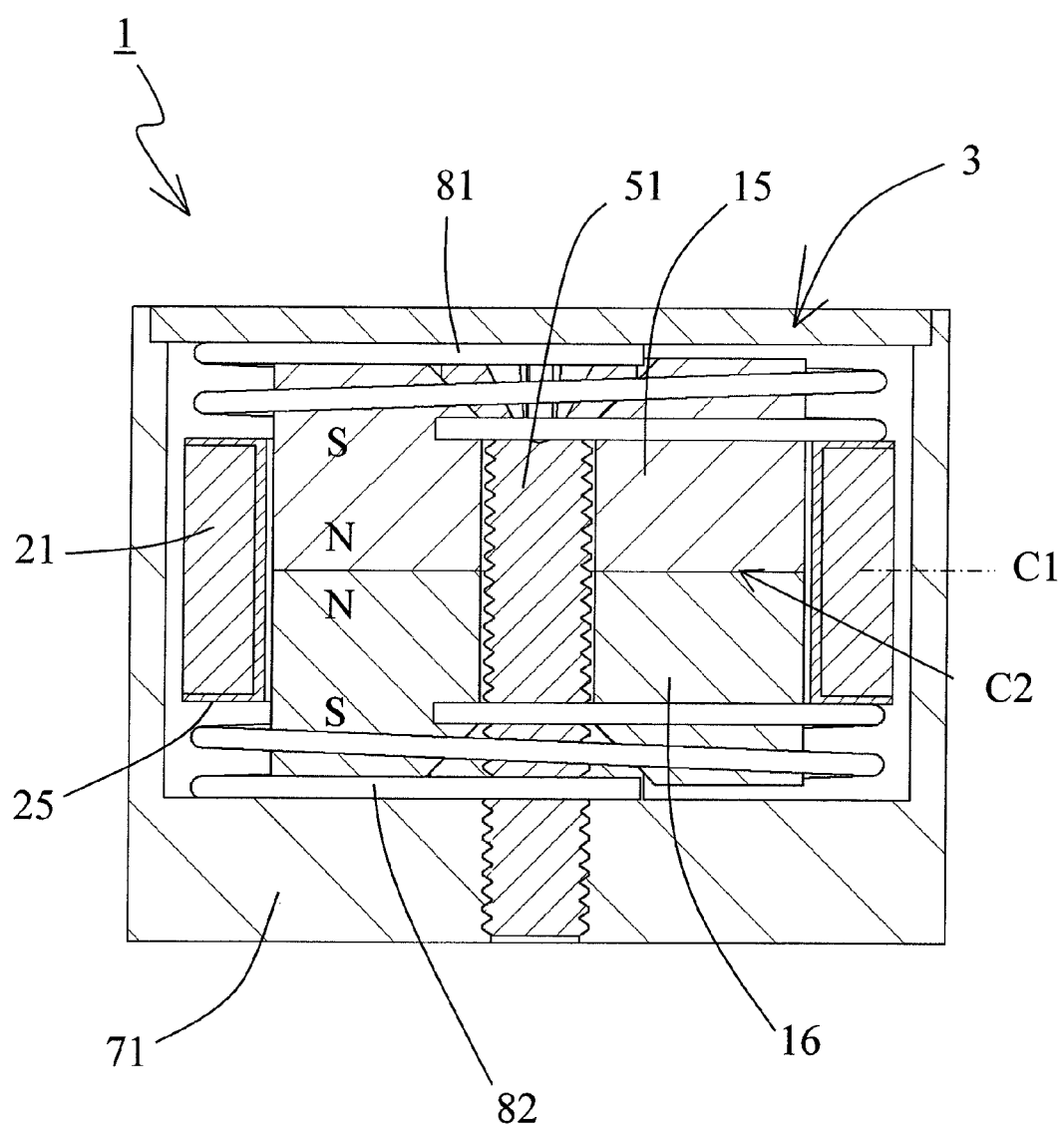
FIG. 18 is a cross-sectional view of an electromagnetic generator according to a first modification of the third example of the invention.

FIG. 18 shows an electromagnetic generator 1 according to a first modification of the third example.

The housing 71 and the coil bobbin 25 are connected to each other by coil springs 81 and 82 instead of the leaf spring that forms the holding part 61, and the electromagnetic generator 1 may be adapted so that the coil bobbin 25 and the solenoid coil 21 can linearly reciprocate when the coil springs 81 and 82 expand and contract due to vibration.

According to this structure, the center C1 of the solenoid coil 21 in the winding axis direction corresponds to a position where magnetic flux density is at a maximum on the plane C2 where the surfaces of the unit magnets 15 and 16 of the magnet assembly 3 corresponding to the same pole face each other, at the time of stop. Accordingly, the magnet assembly 3 reciprocates relative to the solenoid coil 21 from the position where the magnetic flux density is at a maximum. For this reason, a large induced electromotive force can be generated.

The invention is not limited to the above-mentioned embodiments, and may have various modifications without departing from the scope of the invention.

Since it is possible to form an electromagnetic generator that can generate a large amount of electric power even though there is low external environmental vibration, the electromagnetic generator of the invention is useful in industry.

REFERENCE SIGNS LIST

1: electromagnetic generator
3: magnet assembly
4, 5: repulsive magnet
11: guide bar
12: magnet holder
14: center hole of magnet assembly
15, 16: unit magnet
17: circular surface of unit magnet
21: solenoid coil
22: case
23, 24, 71: housing

The invention claimed is:

1. An electromagnetic generator comprising:
a magnet assembly having a plurality of stacked permanent magnets which are magnetized in a direction of stacking so that surfaces of the permanent magnets corresponding to the same pole face each other;
a solenoid coil positioned around a side surface of the magnet assembly, the magnet assembly being configured so that a position of the magnet assembly relative to the solenoid coil can be changed;
holding parts that hold the magnet assembly so that a plane position where the surfaces of the permanent magnets corresponding to the same pole face each other corresponds to a center of the solenoid coil in a winding axis direction at a stop position; and
repulsive magnets for generating magnetic repulsive forces that maintain the magnet assembly separated from the repulsive magnets;
wherein for each of the permanent magnets, a length of an end face of the permanent magnet in a direction perpendicular to the winding axis direction is equal to or larger than double a length of the permanent magnet in the winding axis direction.

2. The electromagnetic generator according to claim 1, wherein the holding parts comprise permanent magnets.

3. The electromagnetic generator according to claim 1, wherein the holding parts comprise elastic bodies.

4. An electromagnetic generator comprising:
a magnet assembly having a plurality of stacked permanent magnets which are magnetized in a direction of stacking so that surfaces of the permanent magnets corresponding to the same pole face each other;
a solenoid coil that is positioned around a side surface of the magnet assembly, the solenoid coil being configured so that a position of the solenoid coil relative to the magnet assembly can be changed;
holding parts that hold the solenoid coil so that a center of the solenoid coil in a winding axis direction corresponds to a plane position where the surfaces of the permanent magnets corresponding to the same pole face each other at a stop position; and
repulsive magnets for generating magnetic repulsive forces that maintain the magnet assembly separated from the repulsive magnets;
wherein for each of the permanent magnets, a length of an end face of the permanent magnet in a direction perpendicular to the winding axis direction is equal to or larger than double a length of the permanent magnet in the winding axis direction.

5. The electromagnetic generator according to claim 1, wherein the holding parts comprise a distance adjusting mechanism facing the magnet assembly for adjusting distances between the holding parts and the magnet assembly.

6. The electromagnetic generator according to claim 5, wherein the holding parts further comprise permanent magnets facing the magnet assembly and corresponding to a magnetic pole repelling the magnet assembly; and wherein the distance adjusting mechanism is configured to adjust distances between the permanent magnets of the holding parts and the permanent magnets of the magnet assembly.

7. The electromagnetic generator according to claim 6, wherein the distance adjusting mechanism comprises a screw mechanism.

8. The electromagnetic generator according to claim 5, wherein the distance adjusting mechanism comprises a screw mechanism.

9. The electromagnetic generator according to claim 1, wherein the holding parts comprise permanent magnets facing the magnet assembly and corresponding to a magnetic pole repelling the magnet assembly, and a distance adjusting mechanism for adjusting distances between the permanent magnets of the holding parts and the permanent magnets of the magnet assembly.

10. The electromagnetic generator according to claim 1, further comprising a first air chamber formed between the holding part and one of the permanent magnets of the magnet assembly, and a second air chamber formed between the holding part and another of the permanent magnets of the magnet assembly, the first and second air chambers being communicated with the atmosphere.

11. The electromagnetic generator according to claim 1, wherein the holding parts are configured so as to interpose the magnet assembly therebetween.

12. The electromagnetic generator according to claim 1, wherein when a distance where the relative position of the magnet assembly and the solenoid coil changes is denoted by X, a length of the solenoid coil in the winding axis direction is denoted by L, and a length of the magnet assembly in the stacking direction is denoted by T, X is set so as to satisfy the expression $X \leq T \times 0.7 - L$.

13. The electromagnetic generator according to claim 2, wherein the holding parts further comprise a distance adjusting mechanism facing the magnet assembly for adjusting distances between the holding parts and the magnet assembly.

14. The electromagnetic generator according to claim 2, wherein the permanent magnets of the holding parts face the magnet assembly and correspond to a magnetic pole repelling the magnet assembly; and wherein the holding parts further comprise a distance adjusting mechanism for adjusting distances between the permanent magnets of the holding parts and the permanent magnets of the magnet assembly.

15. The electromagnetic generator according to claim 3, wherein the holding parts further comprise a distance adjusting mechanism facing the magnet assembly for adjusting distances between the holding parts and the magnet assembly.

16. An electromagnetic generator comprising:
  a magnet assembly having a plurality of stacked permanent magnets which are magnetized in a direction of stacking with like poles facing each other;
  a solenoid coil surrounding side surfaces of the magnet assembly, one of the solenoid coil and the magnet assembly being configured so that a relative position therebetween can be altered; and
  repulsive magnets for generating magnetic repulsive forces that maintain the magnet assembly separated from the repulsive magnets;
  wherein a planar position of the magnet assembly in which the like poles face each other is retained by an elastic body or the magnetic repulsive force of a permanent magnet in such a way as to coincide with the center of the solenoid coil in a winding axis direction; and
  wherein for each of the permanent magnets, a length of an end face of the permanent magnet in a direction perpendicular to the winding axis direction is equal to or larger than double a length of the permanent magnet in the winding axis direction.

17. The electromagnetic generator according to claim 16, wherein when a distance where the relative position between the magnet assembly and the solenoid coil changes is denoted by X, a length of the solenoid coil in a winding axis direction is denoted by L, and a length of the magnet assembly in the stacking direction is denoted by T, X is set so as to satisfy the expression $X \leq T \times 0.7 - L$.

18. The electromagnetic generator according to claim 1, wherein each of the repulsive magnets has an outer diameter and a thickness that are smaller than an outer diameter and a thickness of each of the permanent magnets.

19. The electromagnetic generator according to claim 4, wherein each of the repulsive magnets has an outer diameter and a thickness that are smaller than an outer diameter and a thickness of each of the permanent magnets.

20. The electromagnetic generator according to claim 16, wherein each of the repulsive magnets has an outer diameter and a thickness that are smaller than an outer diameter and a thickness of each of the permanent magnets.

\* \* \* \* \*